(12) United States Patent
Belanger et al.

(10) Patent No.: US 10,759,394 B2
(45) Date of Patent: Sep. 1, 2020

(54) VEHICLE WASH SYSTEM HAVING A MULTI-SPEED CAR WASH BRUSH

(71) Applicant: WashMe Properties, LLC, Northville, MI (US)

(72) Inventors: Michael J. Belanger, Northville, MI (US); Barry S. Turner, Novi, MI (US); Curtis S. Prater, Warren, MI (US)

(73) Assignee: PISTON OPW, INC., Hamilton, OH (US)

( * ) Notice: Subject to any disclaimer, the term of this patent is extended or adjusted under 35 U.S.C. 154(b) by 84 days.

(21) Appl. No.: 16/214,005

(22) Filed: Dec. 7, 2018

(65) Prior Publication Data

US 2019/0176775 A1    Jun. 13, 2019

Related U.S. Application Data

(60) Provisional application No. 62/596,005, filed on Dec. 7, 2017.

(51) Int. Cl.
| | |
|---|---|
| *B60S 3/06* | (2006.01) |
| *B08B 1/02* | (2006.01) |
| *B08B 1/00* | (2006.01) |
| *A46B 7/10* | (2006.01) |
| *A46B 13/00* | (2006.01) |
| *A46B 13/02* | (2006.01) |
| *B66F 7/06* | (2006.01) |
| *A46B 15/00* | (2006.01) |
| *B60S 3/04* | (2006.01) |
| *B08B 1/04* | (2006.01) |
| *B64F 5/30* | (2017.01) |
| *B60S 1/00* | (2006.01) |

(Continued)

(52) U.S. Cl.
CPC ............ *B60S 3/066* (2013.01); *A46B 7/10* (2013.01); *A46B 13/005* (2013.01); *A46B 13/02* (2013.01); *A46B 15/0004* (2013.01); *B08B 1/002* (2013.01); *B08B 1/02* (2013.01); *B60S 3/042* (2013.01); *B60S 3/06* (2013.01); *B60S 3/063* (2013.01); *B66F 7/0666* (2013.01); *A46B 2200/3046* (2013.01); *B08B 1/04* (2013.01); *B60S 1/00* (2013.01); *B60S 3/002* (2013.01); *B60S 3/004* (2013.01); *B64F 5/30* (2017.01); *H02K 9/28* (2013.01)

(58) Field of Classification Search
CPC ..... B60S 3/06; B60S 3/063; A46B 2200/3046
See application file for complete search history.

(56) References Cited

U.S. PATENT DOCUMENTS 4,359,796 A  *  11/1982  Holbus ................... B60S 3/063
                                                            15/53.3

\* cited by examiner

*Primary Examiner* — Randall E Chin
(74) *Attorney, Agent, or Firm* — Dickinson Wright, PLLC

(57) ABSTRACT

A vehicle wash system includes a vehicle treatment area and an overhead frame portion supporting a rotational brush that is translatable relative to a vehicle disposed within the vehicle treatment area. The brush may rotate in the same rotational direction during a first translation direction and a second translation direction of the brush along the vehicle. During one direction of translation, the brush rotates at a first rotational speed, and in the opposite direction of translation, the brush rotates at increased rotational speed. The system may include a pair of side brushes, with the brushes rotating in opposite rotational directions, but maintaining their rotational directions during both directions of translation.

21 Claims, 19 Drawing Sheets

(51) Int. Cl.
*B60S 3/00* (2006.01)
*H02K 9/28* (2006.01)

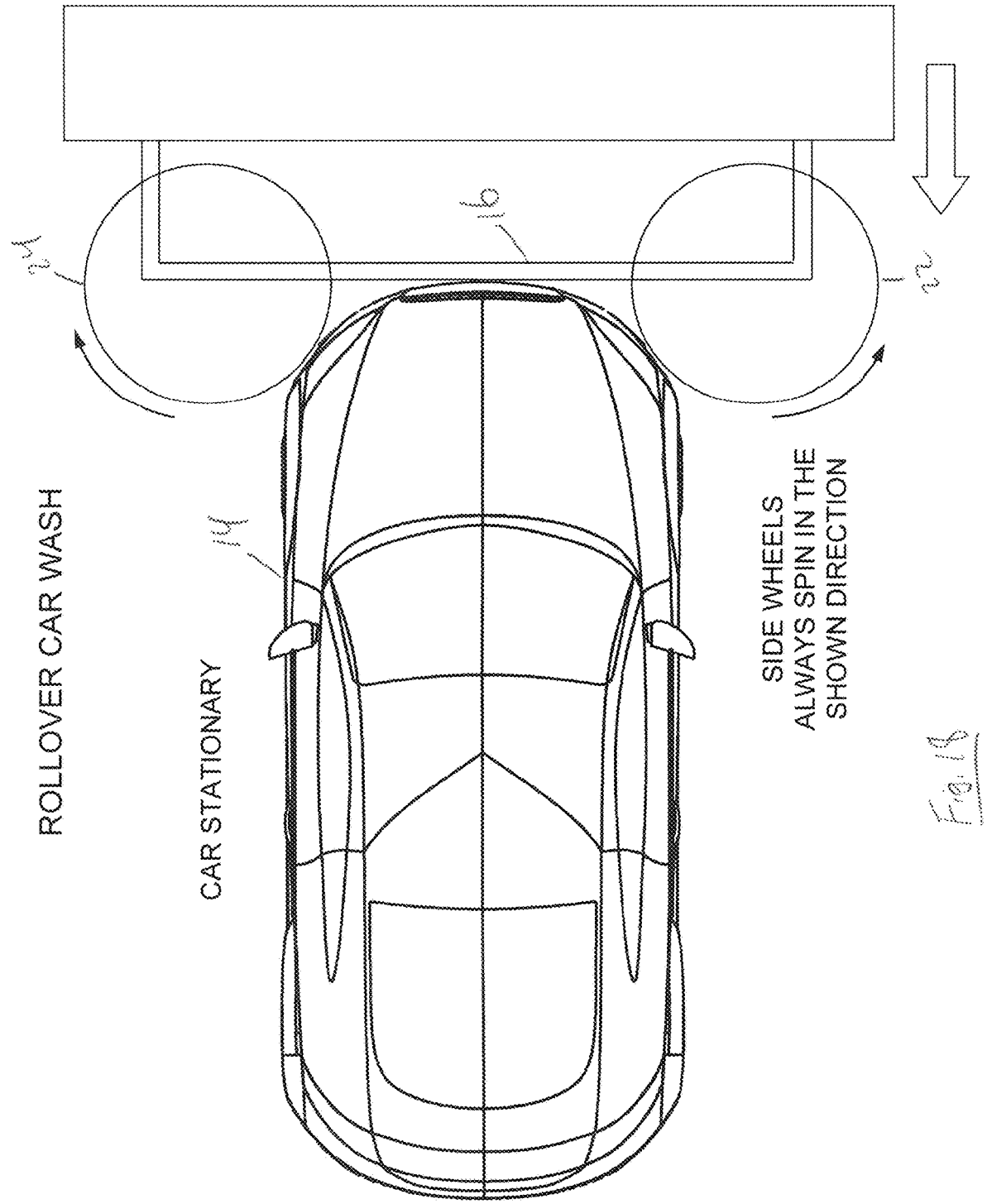

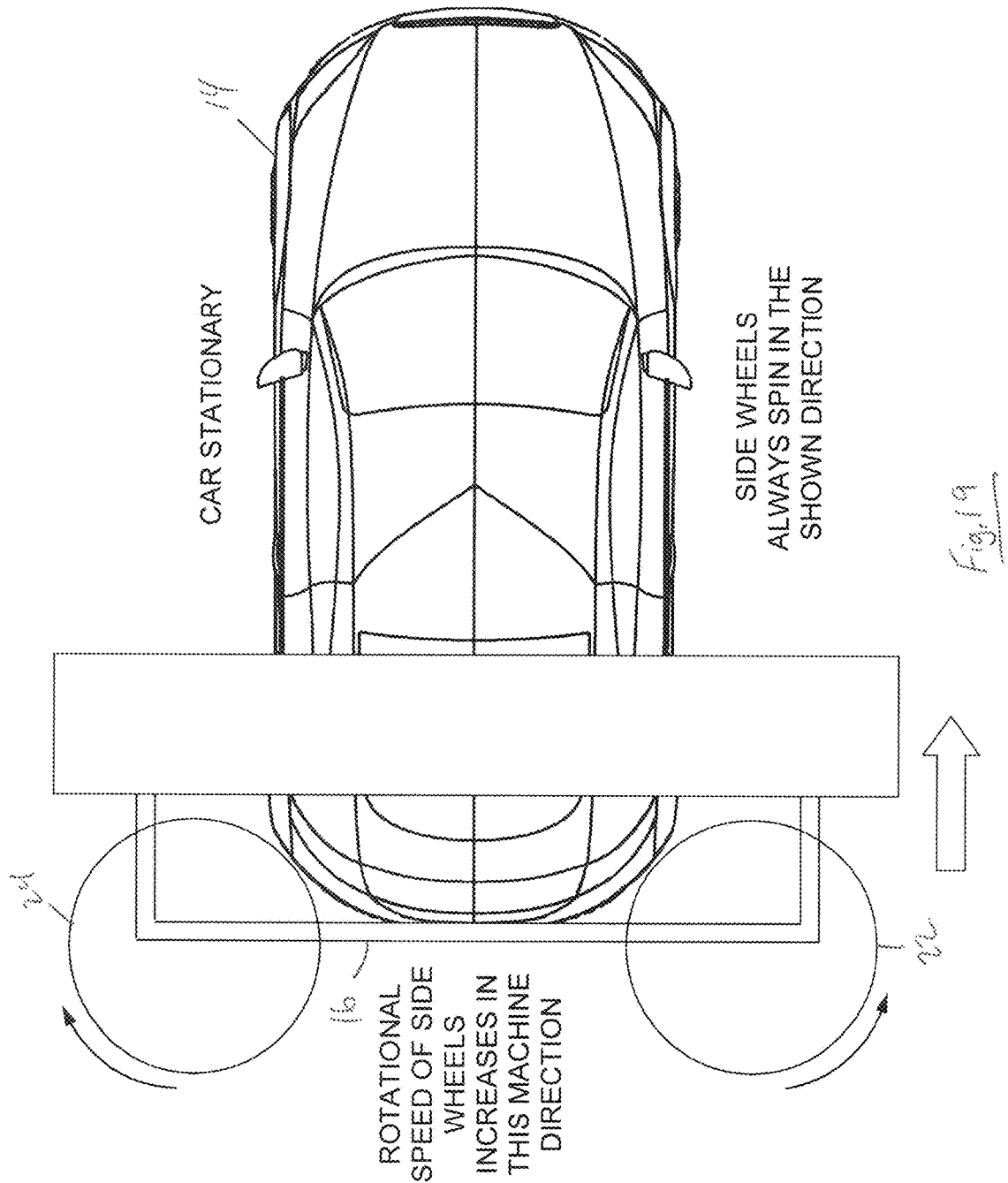

VEHICLE WASH SYSTEM HAVING A MULTI-SPEED CAR WASH BRUSH

CROSS-REFERENCE TO RELATED APPLICATIONS

This application claims the benefit of previously filed U.S. Provisional Patent Application No. 62/596,005, filed Dec. 7, 2017, titled "An Improved Rollover Vehicle Wash System," the entire contents of which is hereby incorporated by reference in its entirety.

This application is related to co-filed United States Patent Applications, filed Dec. 7, 2018, with reference made to the TITLE, including: VEHICLE WASH SYSTEM HAVING A VERTICALLY OPERATED TOP BRUSH WITH PIVOTING ABILITY, Ser. No. 16/213,675; VEHICLE WASH SYSTEM HAVING A VERTICALLY OPERATED TOP BRUSH WITH COLLAPSIBLE GUIDE TRACK SYSTEM, Ser. No. 16/213,605; VEHICLE WASH SYSTEM WITH SIDE BRUSHES HAVING TWO OR MORE AXIAL ORIENTATIONS, Ser. No. 16/213,968; VEHICLE WASH SYSTEM WITH SIDE BRUSHES HAVING THREE OR MORE AXIAL ORIENTATIONS, Ser. No. 16/213,974; VEHICLE WASH SYSTEM HAVING A VERTICALLY OPERATED TOP BRUSH WITH A SCISSOR SUPPORT MECHANISM, Ser. No. 16/213,733; VEHICLE WASH SYSTEM WITH PIVOTING SIDE BRUSHES AND METHOD FOR AVOIDING VEHICLE ANTENNA, Ser. No. 16/213,983; VEHICLE WASH SYSTEM WITH PIVOTING SIDE BRUSHES AND METHOD FOR AVOIDING VEHICLE SIDE MIRRORS, Ser. No. 16/213,994, and the entire contents of each of the above listed co-filed applications is hereby incorporated by reference in its entirety.

TECHNICAL FIELD

The present disclosure relates generally to a vehicle wash system for cleaning an exterior surface of a vehicle. More specifically, the present disclosure relates to a vehicle wash system that includes a multi-speed car wash brush.

BACKGROUND

Vehicle wash systems are in common use to clean passenger vehicles such as automobiles. These vehicle wash systems may include a number of washing components that can be used to clean different sections of the vehicle. For example, wash systems may include a top brush that cleans the top surfaces of the vehicle and side brushes that clean the side surfaces of the vehicle. The top brush is typically raised and lowered relative to the vehicle to clean the varying heights inherent in the top surfaces of vehicles. The top brush may also be moved fore-and-aft to travel along the length of the vehicle, or the vehicle may be conveyed past the top brush to cover the length of the vehicle. The side brushes, similar to the top brush, may be translated fore-and-aft relative to the vehicle to cover the length of the vehicle, either by translating the brush relative to stationary vehicle, or conveying the vehicle past stationary brushes.

One type of wash system is a tunnel type wash system, in which the vehicle passes through generally stationary vehicle treatment components, such as rotatable brushes. In this type of system, the brushes may rotate in different directions based on the specific requirements of the vehicle wash system and the segment of the vehicle to be cleaned.

Another type of wash system is the rollover type system, in which the vehicle may remain stationary, with the brushes translated along the surfaces of the vehicle, including the top surfaces and the side surfaces of the vehicle. The brushes in a rollover system can also have two rotational directions, depending on vehicle wash requirements.

Changing the rotational direction of the brushes requires rotational reversing equipment, such as motor starters, hydraulic valves, and the like. Accordingly, brushes that can change direction are more complicated and costly, both in the initial provision of the components as well as in maintenance and repair.

Brushes that travel in a single direction are simpler to construct. However, due to the translation of the brushes relative to the vehicle, brushes that rotate in a single direction may suffer from feed roller effects, in which the surface feet per minute at the outer circumference of the brush is moving at the same speed and direction as the relative translation of the vehicle. This effect can be amplified for slow rotational speeds of the brush during washing, which may be desirable in many cases.

In view of the above, there is a need for an improved vehicle wash system.

SUMMARY OF THE DISCLOSURE

It is therefore an aspect of the present disclosure to provide a vehicle wash system with improved cleaning of the surfaces of different vehicle types.

It is another aspect of the present disclosure to provide a vehicle wash system with improved cleaning abilities.

It is another aspect of the present disclosure to provide a vehicle wash system that reduces the feed roller effect for rotational brushes.

According to the above and other aspects, a vehicle washing system is provided. The vehicle wash system includes a rotational brush disposed adjacent a vehicle treatment area, the vehicle treatment area having a vertical height, a longitudinal length, and a lateral width and configured to receive a vehicle to be washed, the brush defining a central axis about which the brush rotates, the central axis extending between a first end and a second end of the brush. A brush shaft extends along the central axis and supporting the brush. The brush shaft is rotatable in a first rotational direction. The brush shaft is rotatable at a first rotational speed and a second rotational speed, wherein the first rotational speed is slower than the second rotational speed. The brush has a first translation direction relative to the vehicle and a second translation direction relative to the vehicle that is opposite the first translation direction. The brush shaft rotates at the first rotational speed in the first translation direction and the brush shaft rotates at the second rotational speed in the second translation direction.

BRIEF DESCRIPTION OF THE DRAWINGS

Other aspects of the present disclosure will be readily appreciated, as the same becomes better understood by reference to the following detailed description when considered in connection with the accompanying drawings wherein:

FIG. 18 illustrates a top view of a vehicle wash system with side brushes rotating in a first direction relative to the surface to the be washed and a first direction of travel of the brushes in accordance with an aspect of the present disclosure; and FIG. 19 illustrates a top view of the vehicle wash system of FIG. 18 with the side brushes rotating in the same first rotational direction and being translated in a second direction that is opposite the first direction, with the side brushes rotating at an increased rotational speed in accordance with an aspect of the present disclosure.

DETAILED DESCRIPTION OF THE DISCLOSURE

The present disclosure relates to a vehicle wash system, which may be configured as a rollover type system where the vehicle remains stationary and the various treatment components may be translated and/or moved with respect to the vehicle to perform the vehicle wash process. As is known to one of ordinary skill in the art, a rollover wash system carries various components that treat a vehicle in a predetermined sequence as the rollover wash system makes passes over the length of a vehicle. It will be appreciated that various aspects, components, or portions of the disclosed vehicle wash system may be utilized or employed as part of a conveyor wash system where a vehicle is conveyed past stationary wash components to treat the vehicle exterior as it travels through the wash facility. It will be appreciated that the various aspects, components, or portions of the disclosed vehicle wash system may be employed in connection with a variety of other applications outside of a rollover or conveyor vehicle wash system, such as a manual wash or self-service wash process.

Figure 1:
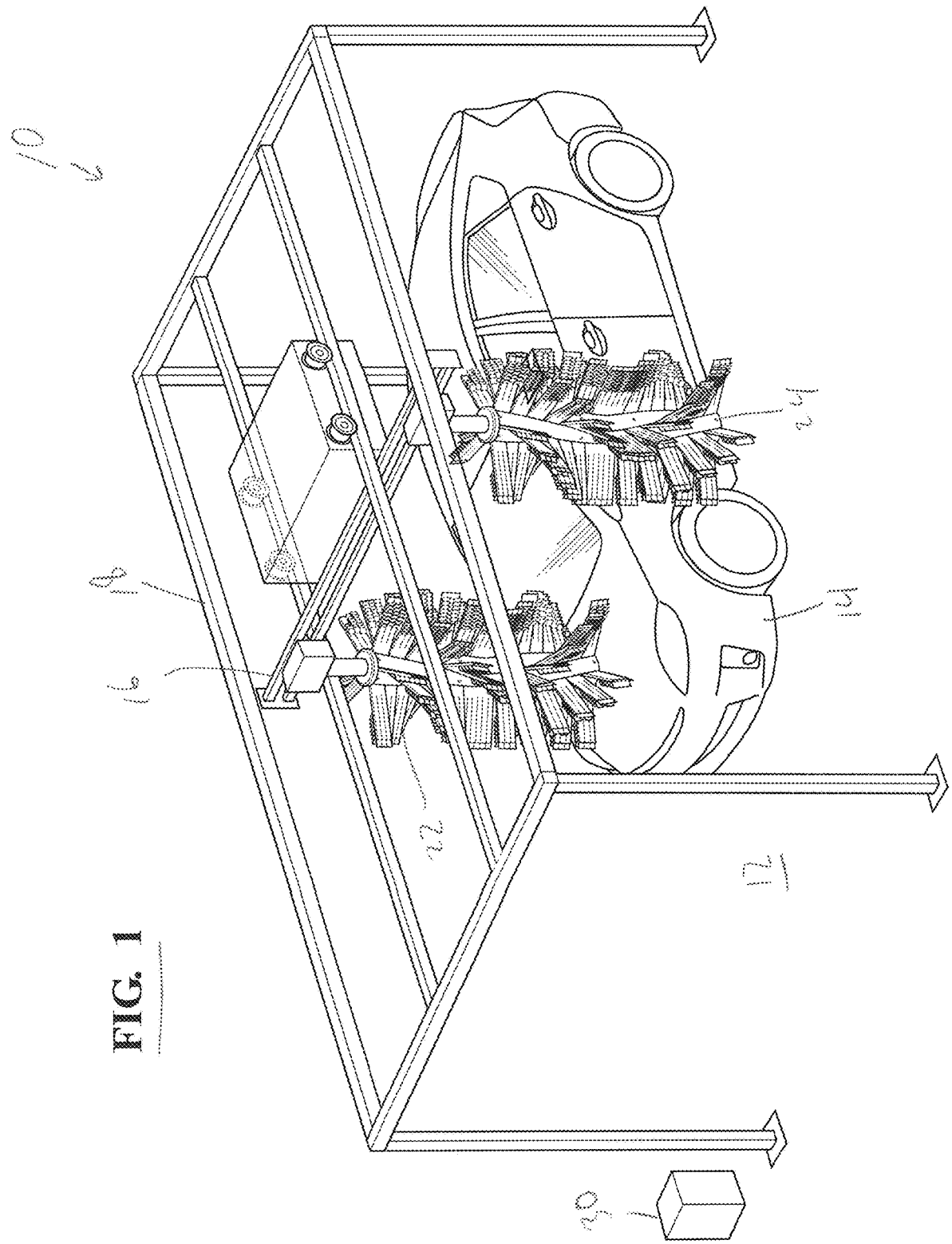
FIG. 1 illustrates a vehicle wash system having an overhead rail structure and a frame supported on the rail structure, with the frame supporting side brushes extending downward.
Figure 2:
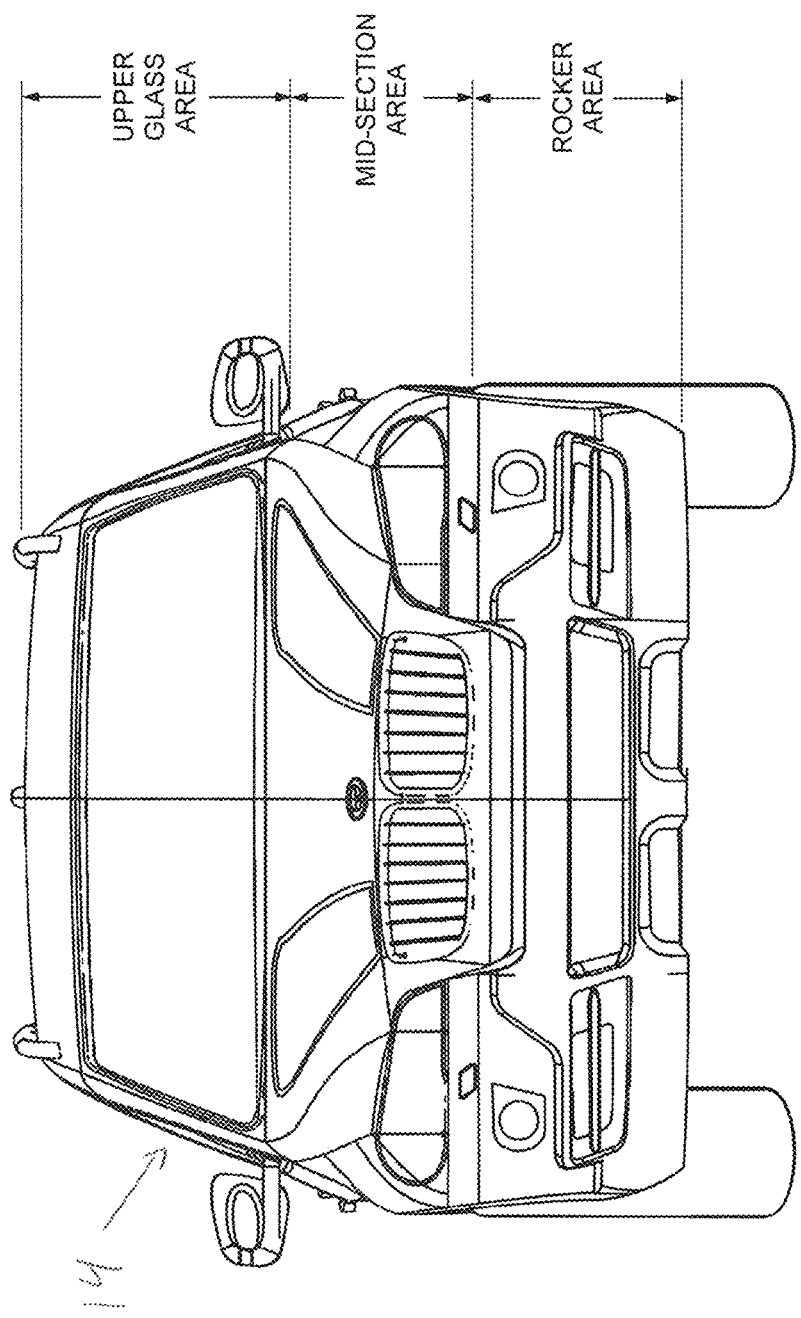
FIG. 2 illustrates a front view of a vehicle for being washed in the vehicle wash system.

With reference to FIG. 1, according to an aspect, the disclosed vehicle wash system 10 includes a vehicle treatment area 12 where a vehicle 14 is to be positioned in a vehicle wash for treatment thereof. As shown, the wash system 10 can include a frame 16 disposed adjacent the vehicle treatment area 12. According to an aspect, the frame 16 may be supported on an overhead rail system 18 such that the frame 16 may reciprocate forwardly and rearwardly on the overhead rail system 18 in order to travel over the length of the vehicle treatment area 12 and the vehicle 14 therein. According to one aspect, the frame 16 does not travel on ground engaging rails. The frame 16 may also support a plurality of treatment components configured to treat an exterior surface of the vehicle 14. According to an aspect as shown in the Figures, the frame 16 may support a top brush 20 (FIG. 4) oriented generally horizontal to the ground and extending laterally across the vehicle treatment area 12 and disposed for treatment of an upper surface of the vehicle 14. The frame 16 may also support a pair of side brushes 22, 24 configured to travel along and treat either side of a vehicle 14 in the vehicle treatment area 12. The pair of side brushes 22, 24 can be oriented generally perpendicular to the ground, and may be pivoted or canted inwardly/outward to treat different segments of the vehicle 14, as further described below.

The frame 16 may carry a variety of other or different treatment components, such as foam nozzles and fluid nozzles, which can emit foam or high pressure fluid onto both the top and sides of the vehicle 14 in the vehicle treatment area 12. It will further be appreciated that the frame 16 may carry or support a variety of other or different vehicle treatment components. The frame 16 may also have a variety of different configurations and may be supported in a variety of suitable ways. The foam nozzles and the fluid nozzles, and other vehicle treatment components attached to the frame 16 may have a variety of different configurations.

According to an aspect, the disclosed vehicle wash system 10 can provide improved cleaning capabilities without yielding a significant increase in the time of the wash process. According to a further aspect, the disclosed vehicle wash system 10 can provide a decrease in the time required to effectuate a vehicle wash process as compared to prior rollover wash systems. The vehicle wash system 10 can include a control system 30 that is in communication with the frame 16 and the various wash components to effectuate the vehicle cleaning process. According to an aspect, the control system 30 can include an electronic motor controller, a programmable logic controller and a communication network on which all of the components can communicate. According to another aspect, the communication network may be an Ethernet network or a wireless network. It will be appreciated that the control system 30 can include a variety of other components. The control system 30 can thus allow the various components on the system to talk to one another.

The control system 30 can also allow for the generation of e-mails and other notifications that can be delivered, including to the operator of the vehicle wash, such as to advise of any faults with the system.

According to a further aspect, the system as an initial step may determine a profile of the vehicle 14 in the vehicle treatment area 12 to be washed. It will be appreciated that this profiling of the geometry of the vehicle 14 may be accomplished in a variety of ways, including by employing a variety of sensors or other detection devices. According to an aspect, the geometric profiling may be accomplished in an initial pass of the frame 16 over the vehicle 14. It will also be appreciated that the geometric profiling can be accomplished in a variety of different ways or by multiple passes of the frame 16 over the vehicle 14. According to a further aspect, the geometric profiling can be accomplished when the vehicle 14 enters the vehicle wash facility or the vehicle treatment area to eliminate a preliminary mapping or profiling pass of the frame.

According to an aspect, once the vehicle exterior has been mapped by the control system 30, it can use this information to dynamically increase the travel speed of the frame 16 along the overhead rail system 18 as appropriate to speed up the wash process. With a roll over wash system, speed of the process is important as, the shorter the wash process, the more processes that can be completed in a given day, which means more revenue for a wash operator.

According to an aspect, with the mapped vehicle exterior, the control system 30 can divide the vehicle into individual segments and then can adjust the position of the brush or brushes and their travel speed. According to an aspect, the control system 30 can vary or adjust the rotational speed of the brushes 22, 24 based on their location with respect to certain vehicle segments. Thus, the linear movement speed of the components and their rotational speed can be dynamically varied depending upon vehicle geometry and other factors. It will also be appreciated that different types of vehicles can have different segments. Exemplary segments can include the following: (i) front fender, (ii) upper glass area; (iii) mid-section area; (iv) rocker area; (v) rear fender; (vi) rear bumper; (vii) rear glass; (viii) front bumper. The control system 30 can obviously take into account a variety of other segments, and can further detected other vehicle geometry such as side mirrors, antennas, ornamentation, or other protruding vehicle elements, which can be avoided during certain passes of the side brushes, 22, 24 if desired.

Figure 11:
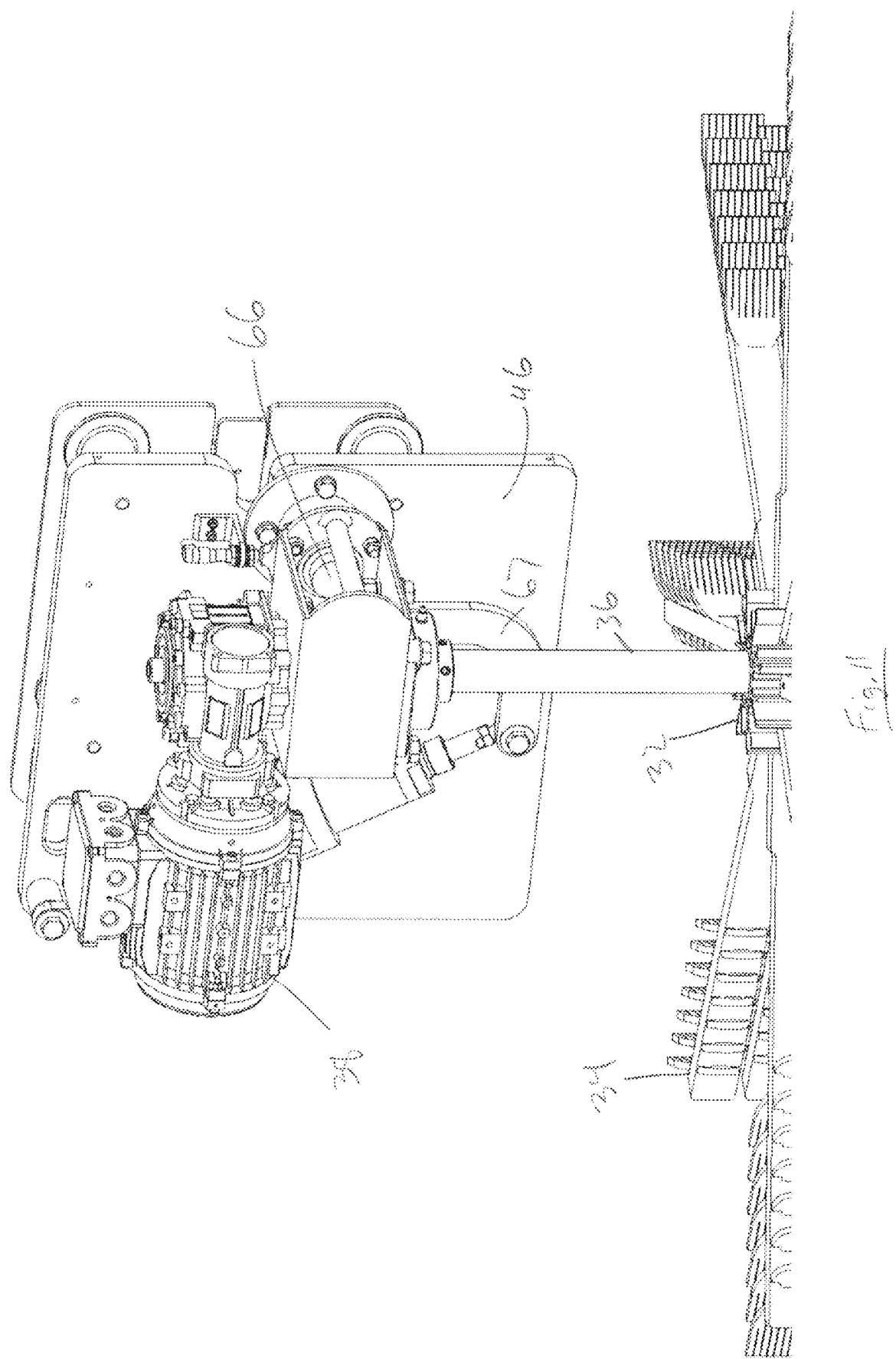
FIG. 11 illustrates the actuator in a nominal position in accordance with an aspect of the present disclosure.

According to an aspect, and with reference to FIG. 11, each of the side brushes 22, 24 can include a hub portion 32 and a plurality of wash media elements 34 disposed around and in communication with the hub portion 32. Each hub portion 32 may be in communication with a drive axle 36 that is secured to or otherwise coupled to the hub portion 32 to effect rotation thereof. Preferably, the plurality of wash media elements 34 are coupled to or secured to the hub portion 32. The drive axle 36 may be in communication with a power source such as a motor 38. It will be appreciated that a variety of suitable power sources may be employed to effect rotation of the side brushes 22, 24. According to an aspect, the wash media elements 34 may be constructed of an EVA foam and may be generally self-supporting along their length. An exemplary media element is disclosed in U.S. Pat. No. 8,990,993, which is owned by the Assignee of the present application. It will be appreciated that the wash media elements may have a variety of different shapes and configurations and may be constructed from a variety of different materials.

According to an aspect, the power source 38 for each side brush 22, 24 may be in communication with a motor controller, which is in communication with the control system 30. The drive axle 36 can define an axis of rotation and each side brush 22, 24 may be actuated such that the orientation of the axis of rotation of each drive axle 36 may vary as dictated by the control system 30. According to an aspect, the drive axle 36 may be pivoted generally between different discrete positions. In a neutral position, shown in FIGS. 4 and 11, the drive axle 36 may be oriented such that the axis of rotation is generally perpendicular to the ground.

Figure 7:
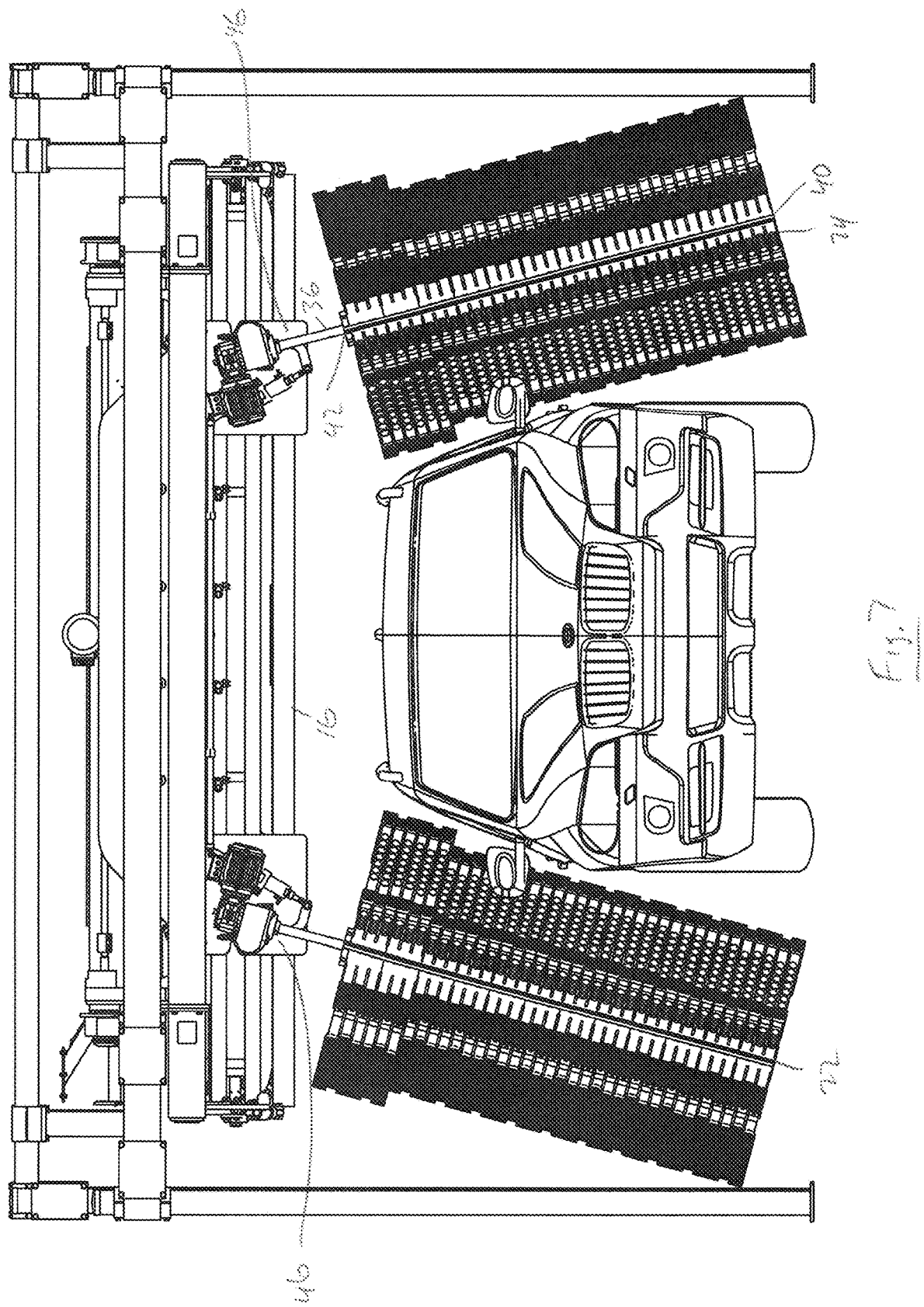
FIG. 7 illustrates a front view of the side brushes with both of the brushes being pivoted outwardly in accordance with an aspect of the present disclosure.
Figure 8:
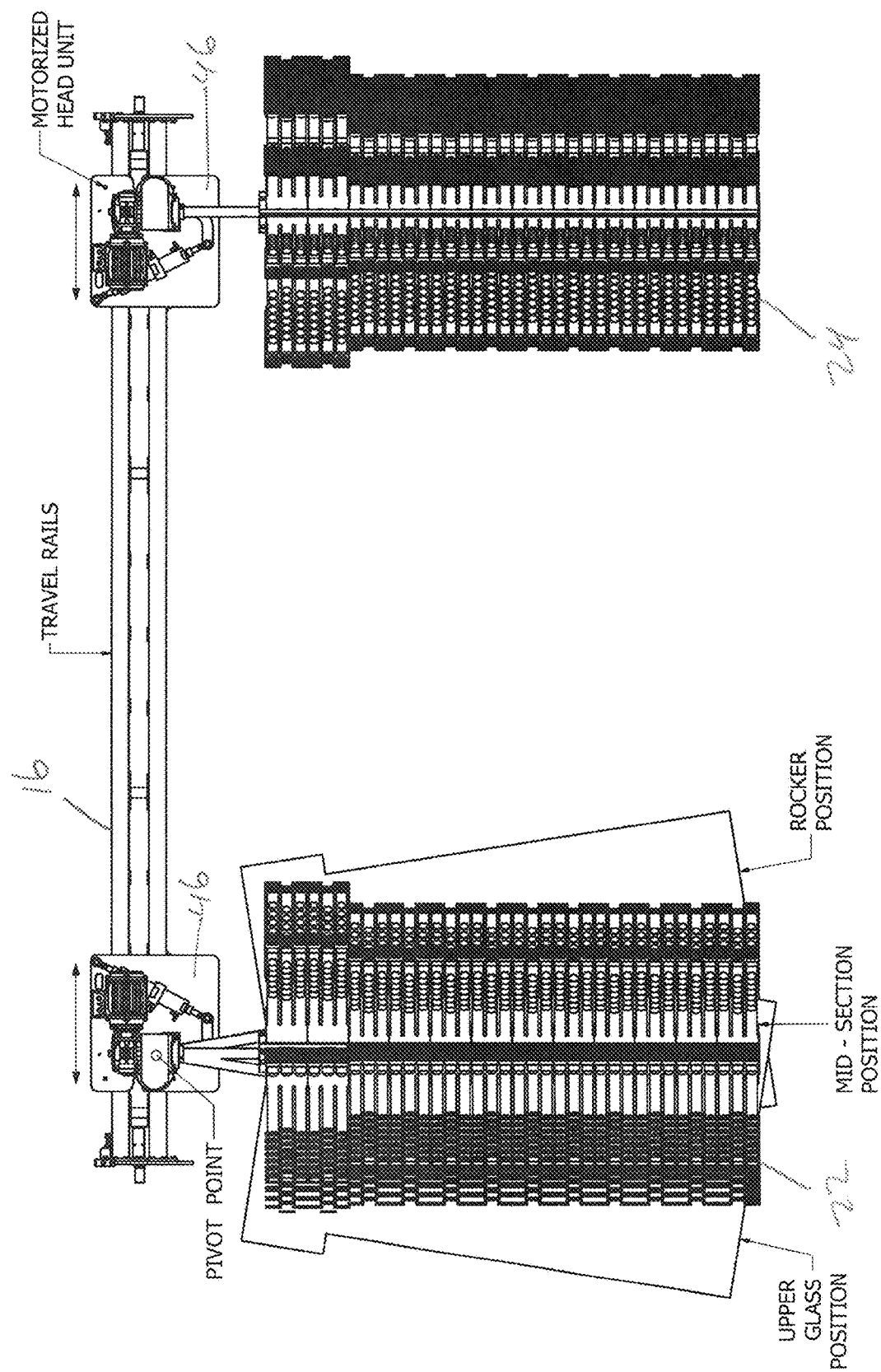
FIG. 8 illustrates one side brush with three different positions and another side brush oriented vertically in accordance with an aspect of the present disclosure.
Figure 9:
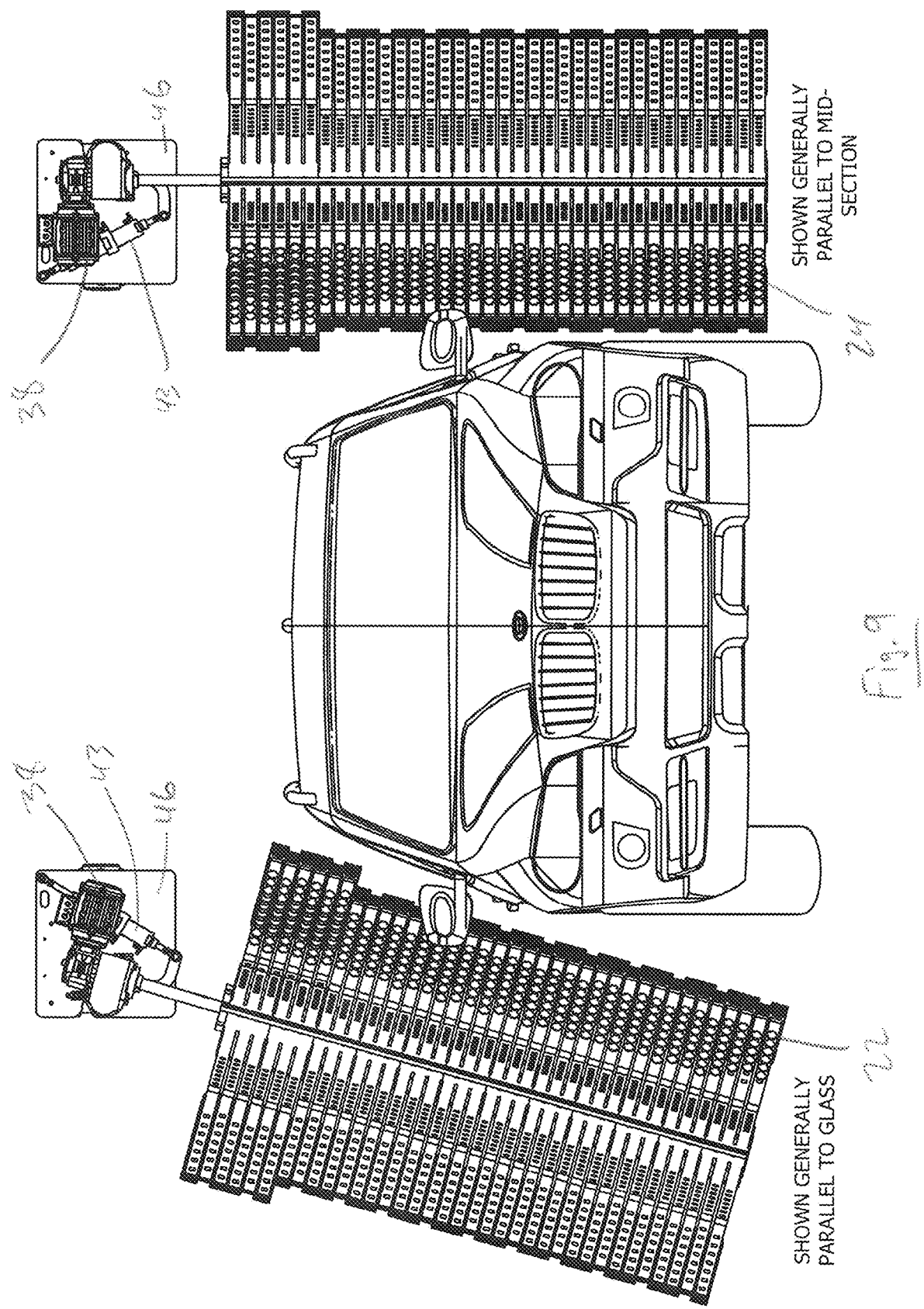
FIG. 9 illustrates one side brush pivoted outward and with an actuator actuated and the other side brush oriented vertically with an actuator in a nominal position in accordance with an aspect of the present disclosure.
Figure 10:
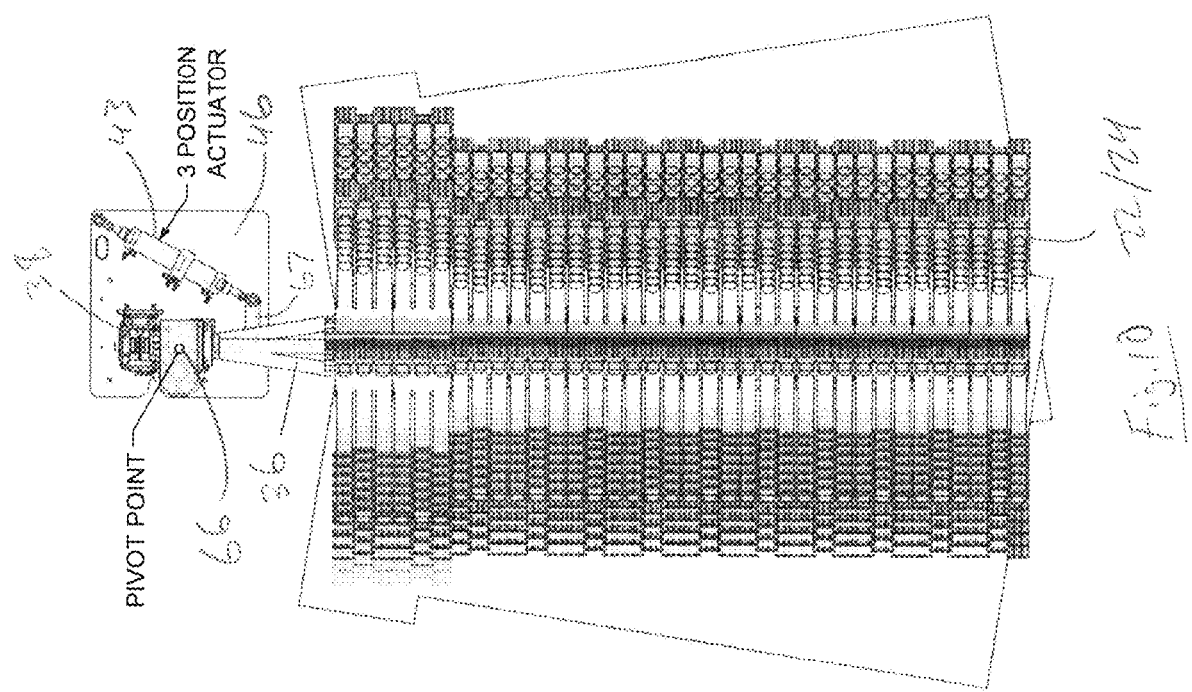
FIG. 10 illustrates a single side brush and a three-position actuator in accordance with an aspect of the present disclosure.
Figure 13:
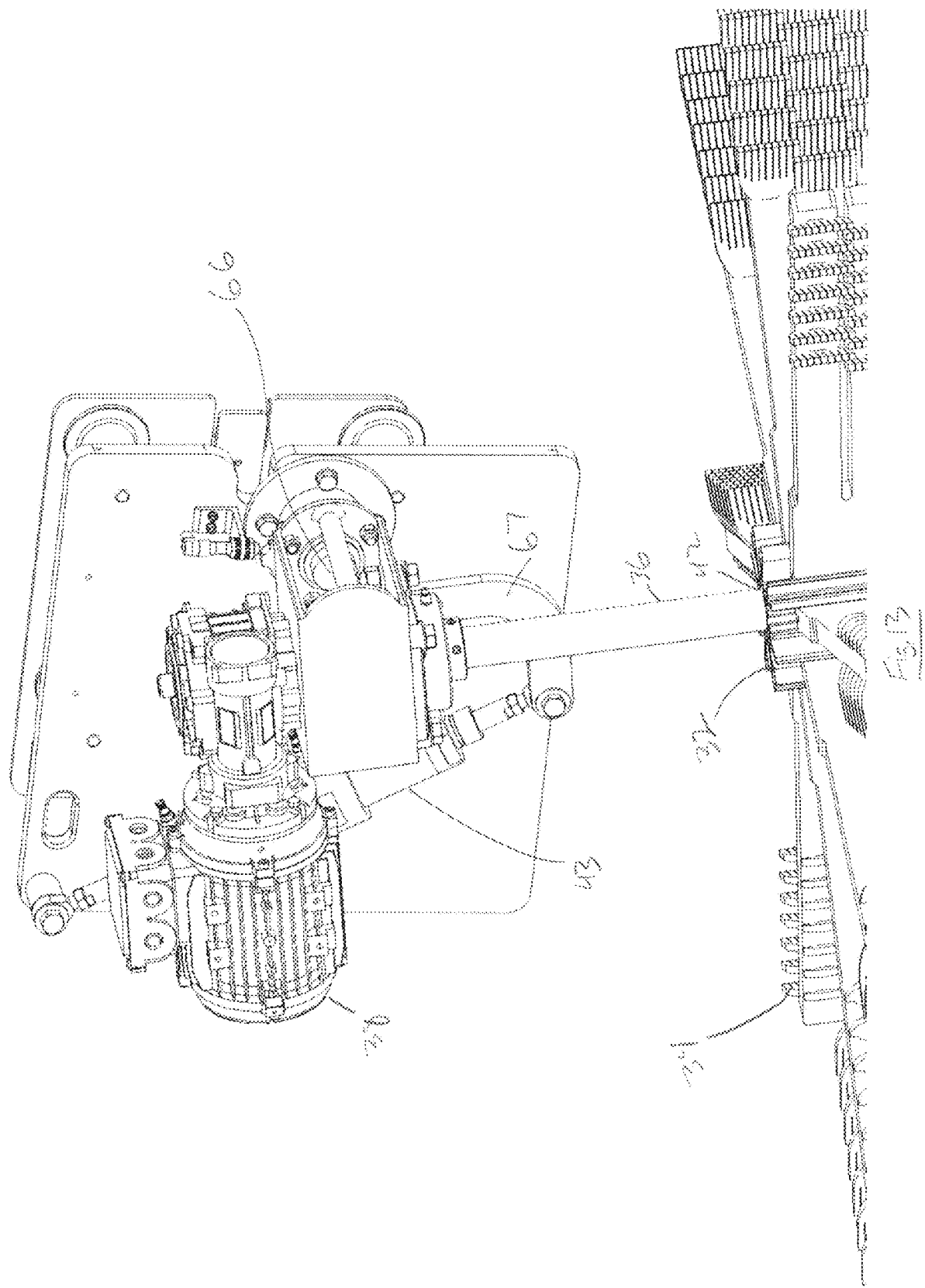
FIG. 13 illustrates the actuator in an outwardly pivoted position in accordance with an aspect of the present disclosure.

In an outwardly canted position, shown in FIGS. 7 and 13, the drive axle 36 may be oriented or tilted such that the axis of rotation is angled outwardly whereby a lower end 40 of the drive axle 36 is disposed further outwardly from the vehicle treatment area 12 than an upper end 42 of the drive axle 36.

Figure 6:
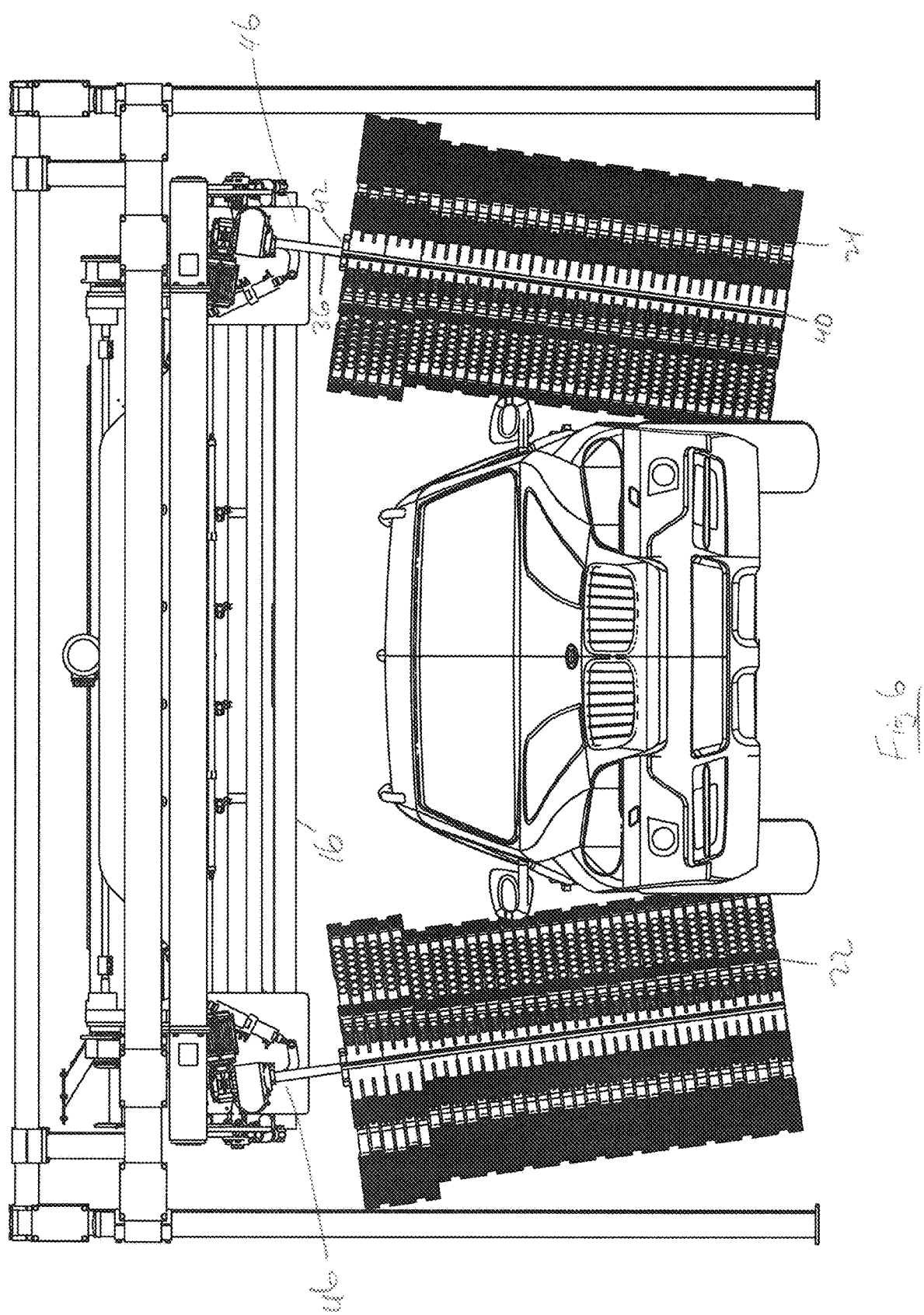
FIG. 6 illustrates a front view of the side brushes with both of the brushes being pivoted inwardly in accordance with an aspect of the present disclosure.
Figure 12:
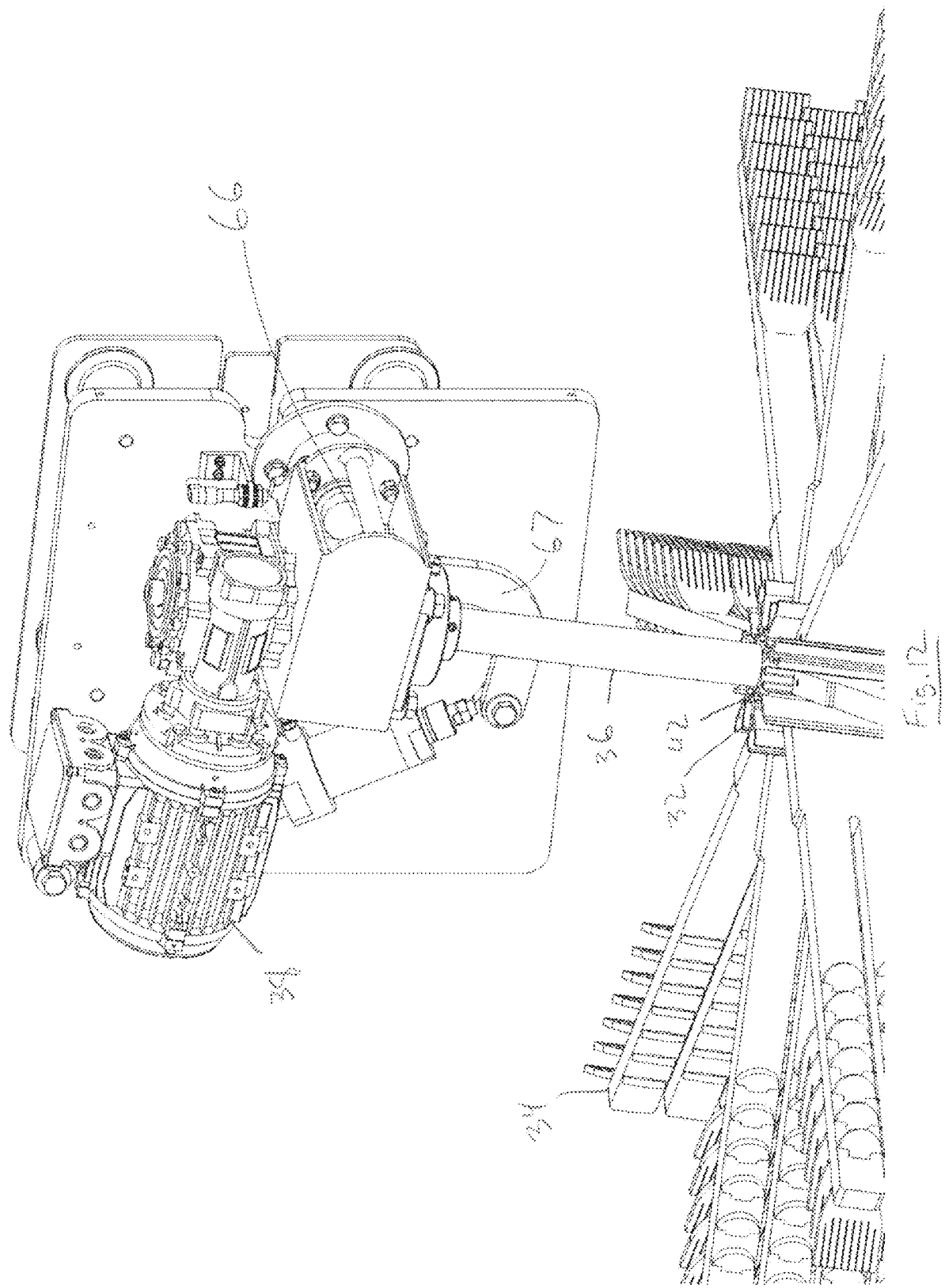
FIG. 12 illustrates the actuator in an inwardly pivoted position in accordance with an aspect of the present disclosure.

In an inwardly canted position, shown in FIGS. 6 and 12, the drive axle 36 may be oriented or tilted such that the axis of rotation is angled inwardly whereby the lower end 40 of the drive axle 36 is disposed further inwardly from the vehicle treatment area 12 than an upper end 42 of the drive axle 36.

With reference to FIGS. 10-13, the drive axle 36 may be pivoted about a pivot point 66 disposed at an upper end by pivoting the motor assembly 38 and axle 36 with respect to the frame 16. The pivoting may be accomplished by an actuator 43, such as a hydraulic cylinder, which may push or pull on a link 67 that is coupled to the axle 36 and motor 38. A variety of other suitable actuators may be employed. The drive axle 36 may also be pivoted in a variety of other suitable ways. The actuator 43 may be referred to as a multi-position actuator, two-position actuator, three-position actuator, or the like. The actuator 43 may include two hydraulic units or pistons, with one or the other being actuated to cause an inward or outward pivoted position of the side brushes 22, 24. As shown throughout the Figures, the actuator 43 may be a three-position actuator, but it will be appreciated that other actuators may also be used.

According to another aspect, a novel connection of the drive axle 36 to the hub portion 32 is disclosed. Current vehicle wash brushes typically include a hub portion 32 with a hollow interior that can receive a drive axle 36 therethrough. A plurality of intermediate spider portions generally extend between and connect the hub portion 32 to the drive axle 36 to secure and connect them so the hub portion 32 rotates with the drive axle 36 to rotate the attached wash media elements 34. These drive axle/hub portion combinations are very heavy and also expensive due to the amount of material required for a full axle and spider portions. According to an aspect, the hub portion 32 can be formed with a plurality of internal threads that can receive a stub hub in threaded engagement to effect securement and coupling of these structures with the stub hub having corresponding threads. To ensure permanent securement an adhesive such as an aerospace grade adhesive can be employed on the threads of the hub and stub. Additionally, a metal pin can also be employed through the hub portion and the stub hub for further securement. This stub thread arrangement eliminates the need for a full drive axle 36 as well as the intermediate spiders, which provides significant weight, cost, and material savings. In other words, the stub hub terminates at the bottom of the threads and is connected to the hub 32 without spiders. It will be appreciated that a variety of other suitable hub arrangements may be employed.

As will be appreciated, each side brush 22, 24, may be carried on the frame 16 by a carrier support portion 46, which may also be referred to as a head unit or carrier 46, as the frame 16 is linearly translated forwardly and rearwardly over the top of the vehicle 14 such that the side brushes 22, 24 may travel along and engage the side of each vehicle. The carrier 46 may translate laterally inward and outward along the rails of the frame 16 to position the side brushes 22, 24 at the appropriate lateral location depending on the width of the vehicle to be treated and a particular canted or pivoted position of the side brushes 22, 24.

Figure 4:
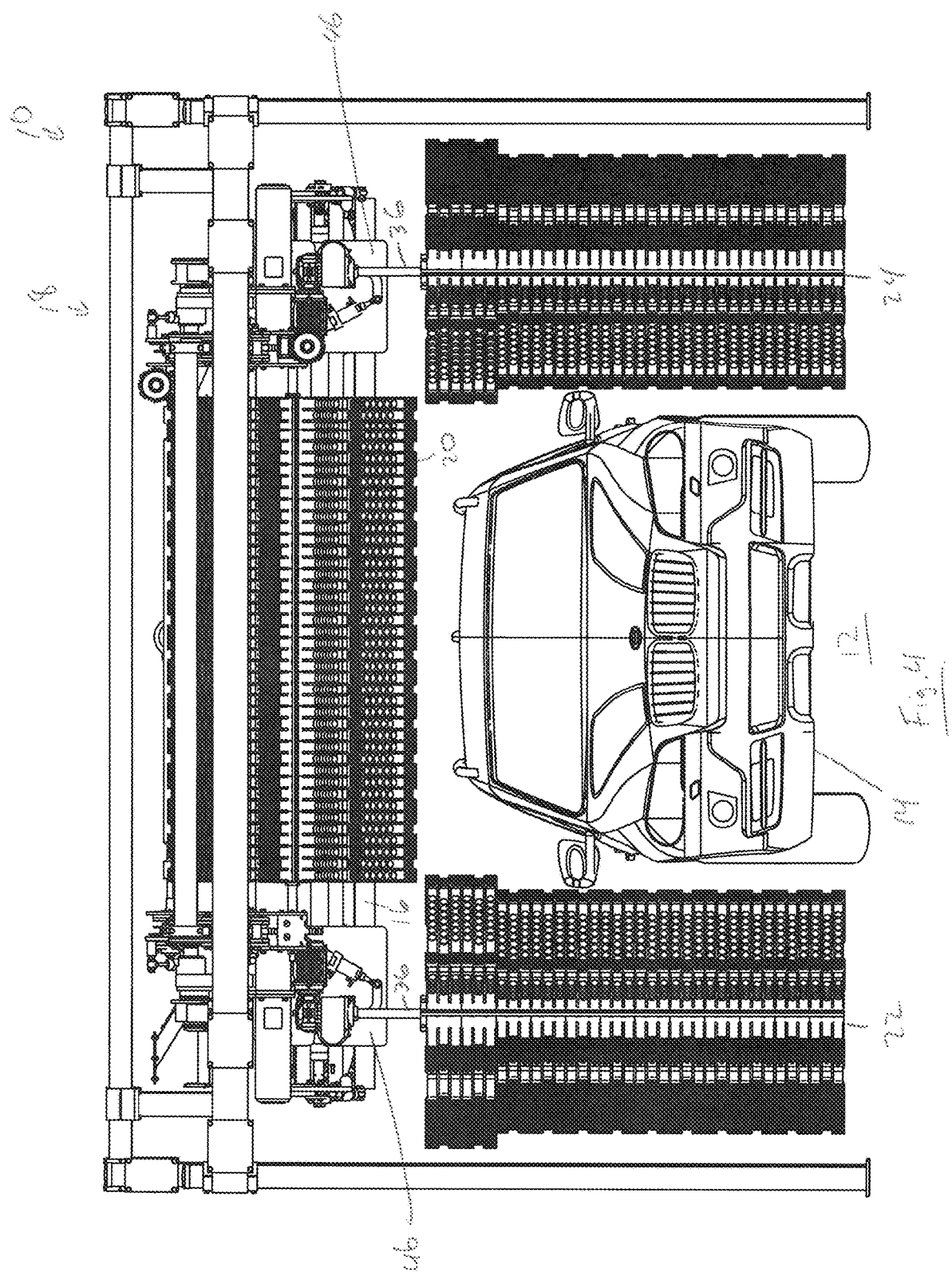
FIG. 4 illustrates a front view of the wash system, including a top brush oriented horizontally and a pair of side brushes oriented vertically in accordance with an aspect of the present disclosure.
Figure 5:
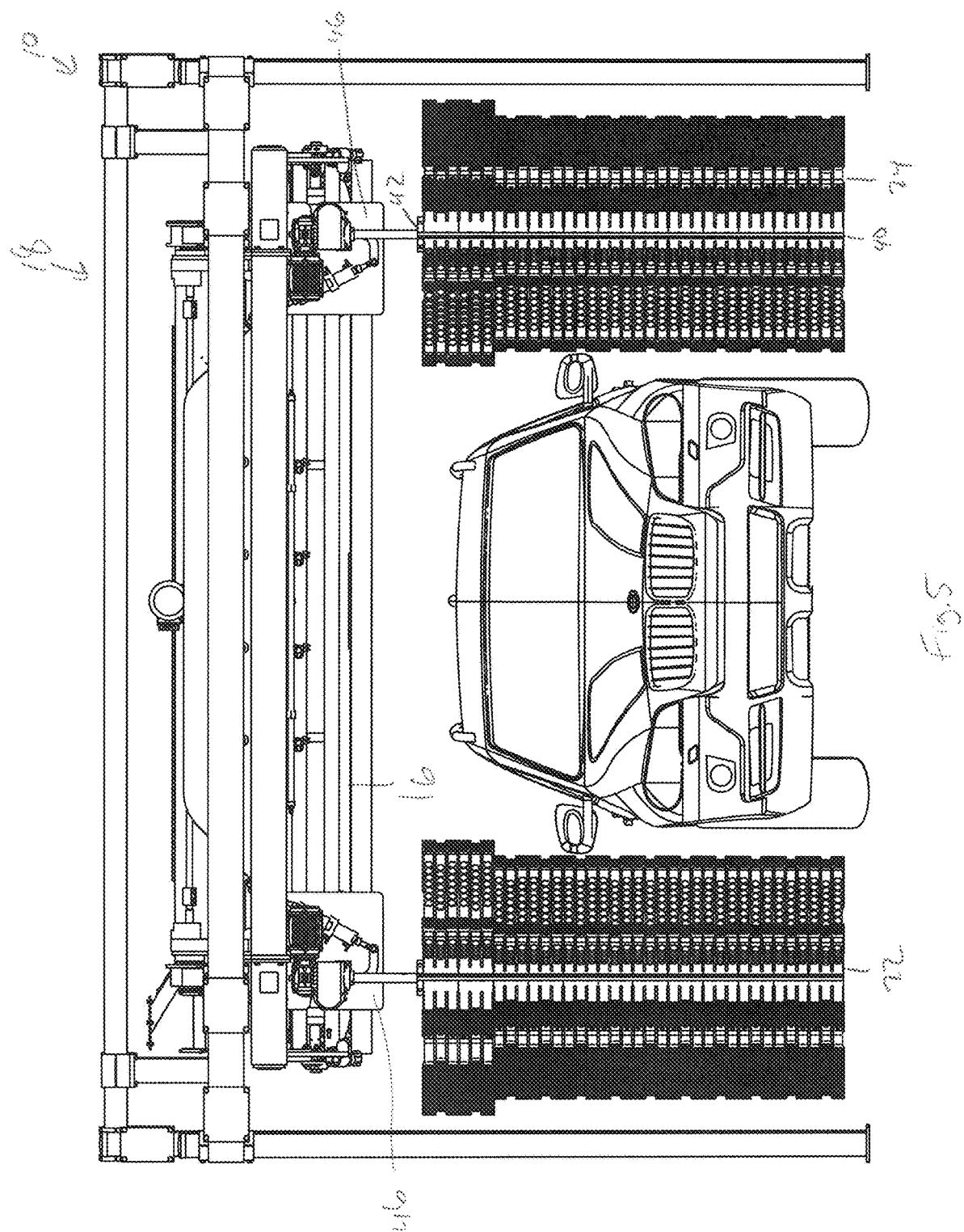
FIG. 5 illustrates a front view of the wash system, with the top brush removed in accordance with an aspect of the present disclosure.

For example, when the side brushes 22, 24 are canted inwardly, the carrier 46 may be moved laterally outward, and when the side brushes 22, 24 are canted outwardly, the carrier 46 may be translated laterally inward. When the side brushes 22, 24 are oriented vertically, the carrier 46 may be disposed laterally between its positions that correspond to the inwardly or outwardly canted positions. FIGS. 4-7 illustrate the different lateral positions of the carrier 46 depending on the pivoted position of the side brushes. FIGS. 4 and 5 show the side brushes 22, 24 in a nominal position. FIG. 6 shows the carrier 46 moved laterally outward when the side brushes 22, 24 are pivoted inwardly. FIG. 7 shows the carrier 46 moved laterally inward when the side brushes 22, 24 are pivoted outwardly.

As will be understood, from a nominal position in which the side brushes 22, 24 are oriented vertically and in contact with the outermost portion of the vehicle 14, if the brushes were canted outwardly, the brushes 22, 24 would move away from the vehicle 14, and therefore moving the carrier 46 inward brings the side brushes 22, 24 back into contact with the side of the vehicle 14. Similarly, if the brushes 22, 24 were canted inwardly, the brushes 22, 24 can impact the vehicle if the carrier 46 does not shift laterally outward.

As the side brushes 22, 24, travel along the side of the vehicle 14 they may be oriented in either the neutral or inwardly/outwardly canted positions. According to an aspect, in a first pass of the frame 16 over the vehicle, the side brushes 22, 24 may be oriented in the neutral position in order to effectively clean generally vertical side surfaces of the vehicle 14. According to still another aspect, in a second pass of the frame 16 over the vehicle, the side brushes 22, 24 may be disposed in an outwardly canted position, to effectively engage and clean upper portions of the vehicle sides, such as windows. According to an aspect, the side brushes 22, 24 may be oriented in the inwardly canted position during a further pass of the frame 16 over a vehicle such that a lower portion of each of the side brushes 22, 24 can engage a lower portion of the vehicle sides, such as rocker panels. The brushes 22, 24 are shown throughout the Figures in different canted positions for treating different segments of the vehicle. In many Figures, the brushes 22, 24 are shown not to be in contact with the vehicle, but these illustrations are for clarity, and it will be appreciated that to clean the surfaces of the vehicle 14 that the brushes 22, 24 would indeed be in contact with the surfaces of the vehicle.

Thus, the control system 30 may position the side brushes 22, 24 in different positions with respect to vehicle sides such that with separate passes of the frame 16 over the vehicle 14, the side brushes 22, 24 may clean and engage different portions of a vehicle side surface during the process. It will be appreciated that the control system 30 may orient the side brushes 22, 24 at different angles within each position and particularly the outwardly canted positions. For example, the angle of the outward cant may be larger when the side brush 22 or 24 is engaging the front portion of the vehicle relative to the angle of the outward cant when the side brush 22 or 24 is engaging the window portion of the vehicle. Obviously, the amount of pivot or canting can depend on the vehicle profile. It will further be appreciated that the order of each of those positions for the various passes can vary. For example, the inwardly canted pass, the outwardly canted pass, or the neutral pass may be performed first, second, or third, and may be repeated. In another aspect, the pivot or canting may change during each pass depending on the vehicle segment being treated.

According to still another aspect, when the carrier support portions 46 for the side brushes 22, 24 reach the rear of the vehicle, the carrier support portions 46 may translate the side brushes 22, 24 inwardly along the frame 16 to traverse the rear surfaces of the vehicle 14. The same drive mechanism that shifts the carrier 46 when the brushes 22, 24 are canted may be employed to move the carrier 45 along the rear surface of the vehicle 14. The side brushes 22, 24 may be oriented vertically during this pass along the rear surface. When traversing the rear surface of the vehicle, the side brushes 22, 24 can be tilted into two positions. In one pass of the rear vehicle surface, the drive axle 36 may be oriented in a first position whereby it is generally vertical such that the side brushes are also generally vertical. In a second pass of the rear vehicle surface, the side brushes 22, 24 may be oriented generally outwardly in order to effectively clean a rear vehicle window of the SUV. To achieve this canted position, the frame 16 may be pivoted relative to the rail system 18. To the extent, the control system 30 senses that the vehicle in the vehicle treatment area 12 is a truck or vehicle, the side brushes may only be oriented in a vertical position only for a single pass. It will also be appreciated that according to another aspect, the control system 30 may be configured such that only one side brush 22, 24 traverses the rear portion of the vehicle 14 to effect cleaning.

According to another aspect, the side brushes 22, 24 may also traverse the front surface of a vehicle. However, because most front vehicle surfaces are generally vertical, only a single pass of one or both of the brushes 22, 24 in a generally vertical orientation may be necessary. It will additionally be appreciated that the magnitude of the angles and positions of the brushes along the front, back and side surfaces can vary depending upon the type of vehicle sensed in the vehicle treatment area, i.e., vehicle, truck or SUV.

In another aspect, the front and rear surfaces of the vehicle 14 may be treated by the top brush 20, and the side brushes 22, 24 may remain in laterally outer positions.

Figure 3:
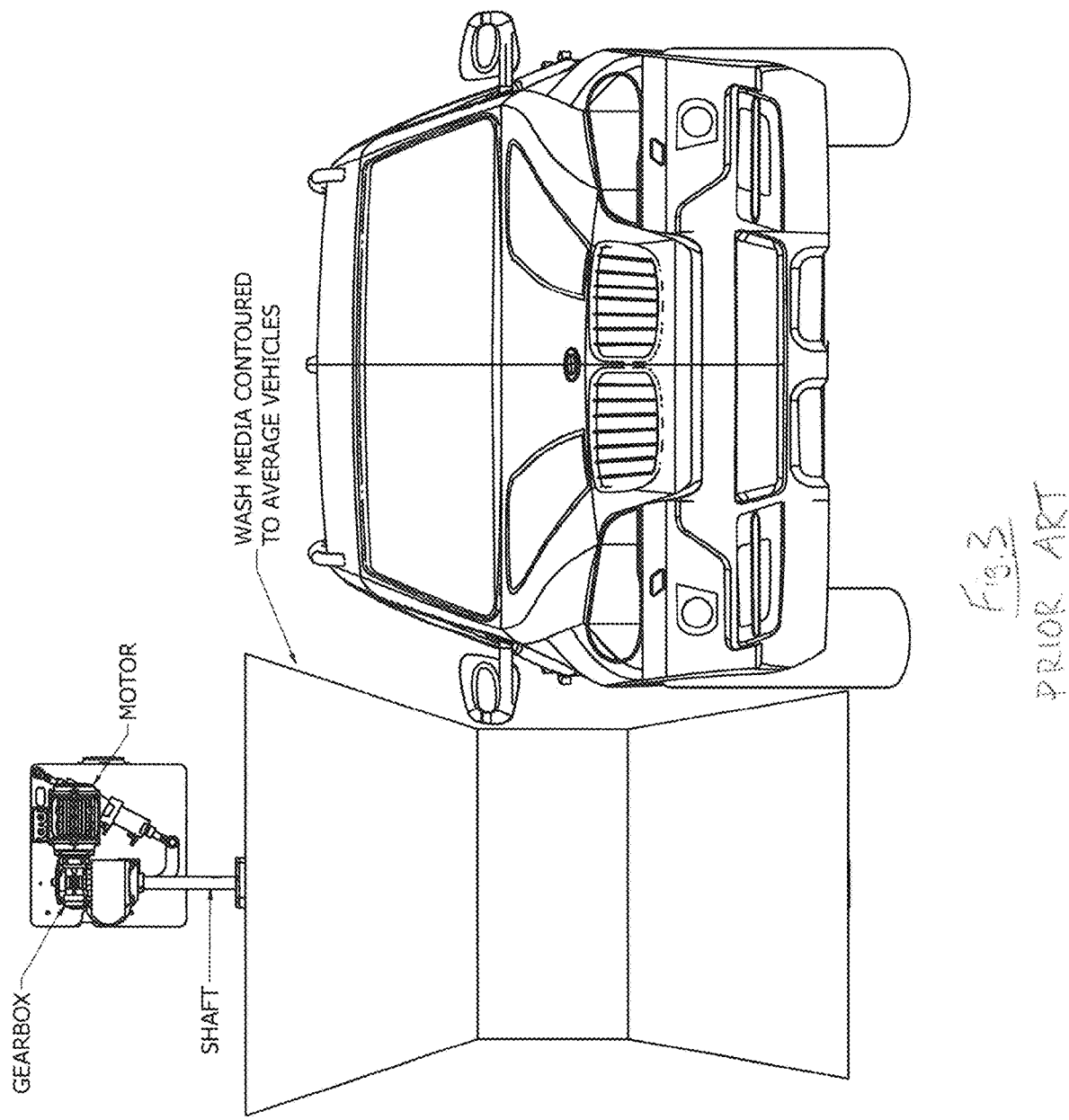
FIG. 3 illustrates a view of a prior art vehicle wash system having a contoured side brush with enlarged upper and lower diameters.

The side brushes 22, 24 may have a generally constant diameter, taking into account the lengths of the wash media 34. Put another way, the hub 32 or axle 36 may have a generally constant diameter, and the wash media 34 may have a generally constant length. In this approach, when the brushes 22, 24 are rotated about their axis and the wash media 34 extend outwardly in response to the rotational forces, the profile of the brushes 22, 24 will have a generally constant diameter. The ability of the brushes 22, 24 to tilt between the neutral position relative to the canted positions thereby allows the brushes 22, 24 to contact the varying surface contours of the vehicle. Prior side brushes, such as those shown in FIG. 3, have included upper and/or lower portions with larger or contoured shapes relative to the lower portion to account for the side glass or windows of the vehicle. But these prior brushes would therefore have a different surface speed per minute (SFPM) at the larger portions relative to the smaller portions for a given rotational speed. Accordingly, this could result in increased noise due to the increased SFPM. Reducing the SFPM of the larger portion to reduce the noise would result in an SFPM of the lower portion that is lower than desired. By canting the side brushes 22, 24 with a generally constant diameter, the SFPM may be kept generally consistent for a given rotational speed.

It will be appreciated that the brushes 22, 24 may still have a varying diameter in some cases. For example, as shown in the Figures, the uppermost portion of the brushes 22, 24 has a slightly larger diameter than the remainder of the brush. The slightly larger diameter does not substantially alter the SFPM of the brush, and the ability of the brushes 22, 24 to be canted outwardly allows for the increase in diameter to be limited, unlike the prior art brushes that remained vertical and had to account for various vehicle geometries.

The side brushes 22, 24 may be controllable by the control system 30 in response to mapping the vehicle exterior and determining the vehicle geometry. The control system 30 can therefore determine when to pivot or cant the side brushes 22, 24 and when to position the side brushes 22, 24 vertically based on a position of the side brushes 22, 24 relative to the vehicle 14. For example, at a front portion of the vehicle side surface, the brushes may be oriented vertically. At a middle portion, such as the area where the windows are located, the brushes 22, 24 may be canted, and at a rear portion after passing the windows, the side brushes 22, 24 may be oriented vertically again. However, the side brushes 22, 24 may also remain in one of the neutral or canted positions throughout the length of the pass, and multiple passes may be made to contact multiple surfaces of the vehicle. It will be appreciated that there are various combinations of pivoting and numbers of passes that may be employed for different vehicle shapes.

In one aspect, even when multiple passes are made as described above, the side brushes 22, 24 may be oriented vertically during the canted pass in areas where canting is not necessary, such as the front and rear. Alternatively, the canted pass may be limited to the area where canting is necessary.

During operation of the side brushes 22, 24, the control system 30 may receive position feedback from the side brushes 22, 24 to determine when to cant the brushes 22, 24 and when to shift the brushes 22, 24 based on the detected vehicle contour. The control system 30 can therefore accurately position the side brushes 22, 24 to provide an optimal washing operation, and can achieve high washing accuracy without requiring more complicated torque control feedback.

The angles of the pivoting and canting may vary depending on the vehicle geometry. The inward canting may be at a different angle that the angle used for the outward canting, or the angle of canting may vary during a pass or between passes.

The canting angles, for both the inward canting and outward canting may be preset based on detected generic vehicle body type, or may be adjusted based on the body shape of the specific vehicle. For example, if a sedan is detected, the outward cant angle may be greater than if a SUV is detected. Alternatively, the canting angles may be preset and applied regardless of the vehicle body type, with a cant angle selected that is effective for a range of window angles and rocker areas.

Figure 14:
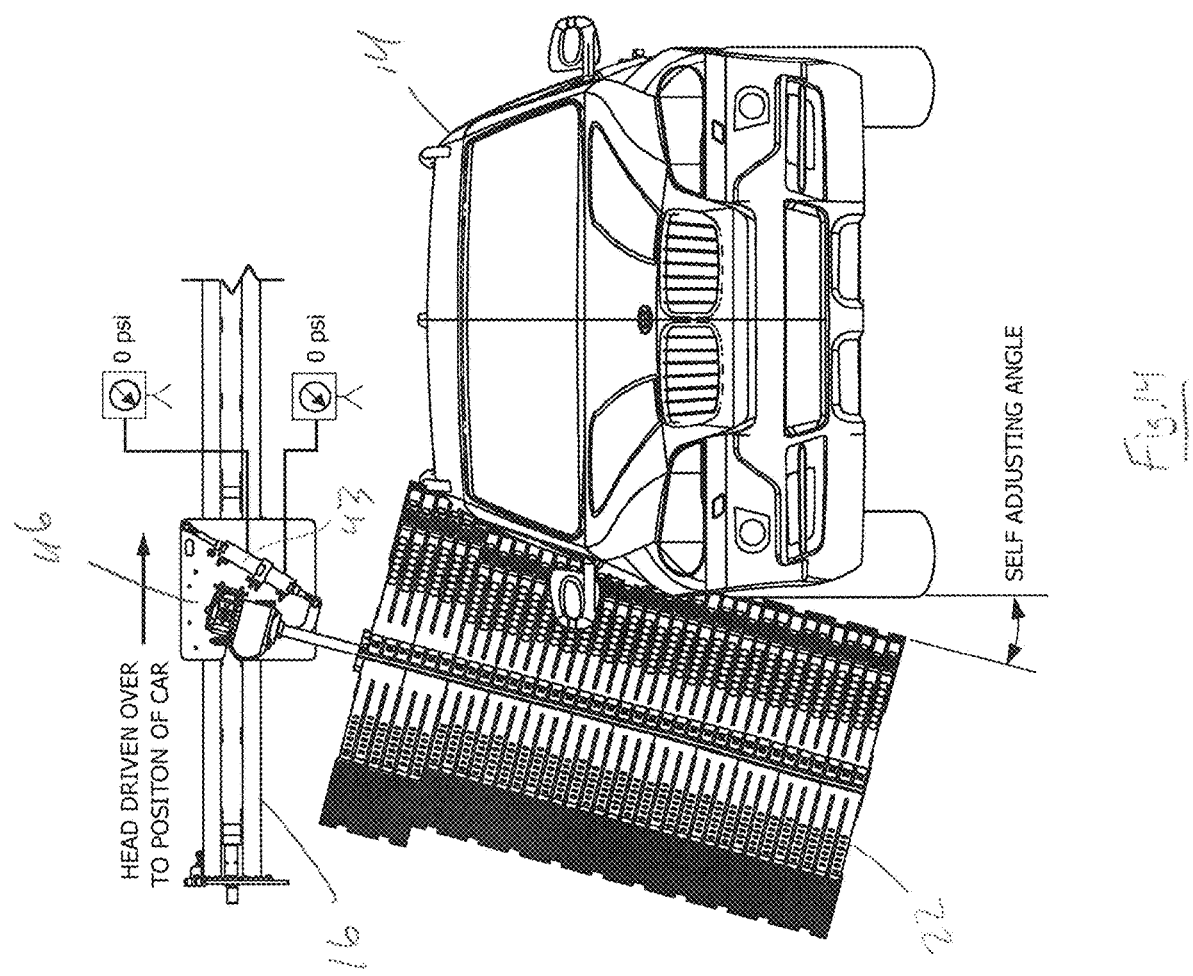
FIG. 14 illustrates a side brush in a pivoted position that is self-adjusting in accordance with an aspect of the present disclosure.
Figure 15:
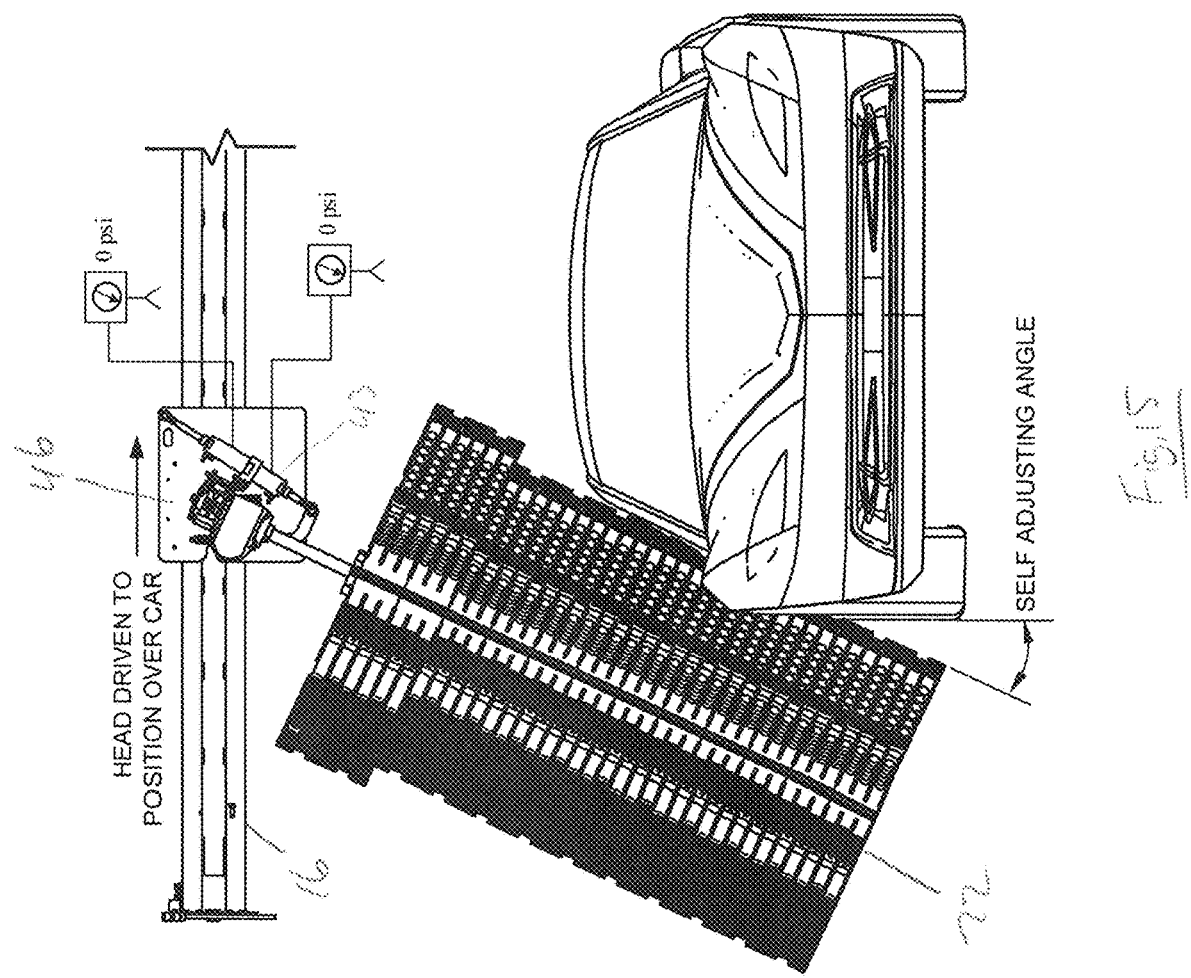
FIG. 15 illustrates a side brush in another pivoted position that is self-adjusting in accordance with an aspect of the present disclosure.

With reference to FIGS. 14 and 15, the canting angle of the outwardly canted orientation may also be self-adjusted based on the shape of the vehicle being treated, and without a specific controlled angle. The self-adjusted outwardly canted position may be achieved in response to shifting the carrier 46 laterally inward along the rails of the frame 16.

For example, the carrier 46 maybe moved inwardly over the top of the vehicle 14, and the brush 22, 24 may contact the side of the vehicle 14, causing the brush 22, 24 to pivot relative to the carrier 46. In this approach, the actuator 43 may be set to an inactive state, in which the pistons of the actuator may freely move within their housing. Put another way, the brushes 22, 24 may be free to swing relative to their pivot point 66 at the carrier 46. FIGS. 14 and 15 show two different outwardly canted positions based on different types and shapes of the vehicle 14 being treated. FIG. 15 is pivoted more than FIG. 14. The actuator 43 is illustrated as being at 0 psi.

Figure 16:
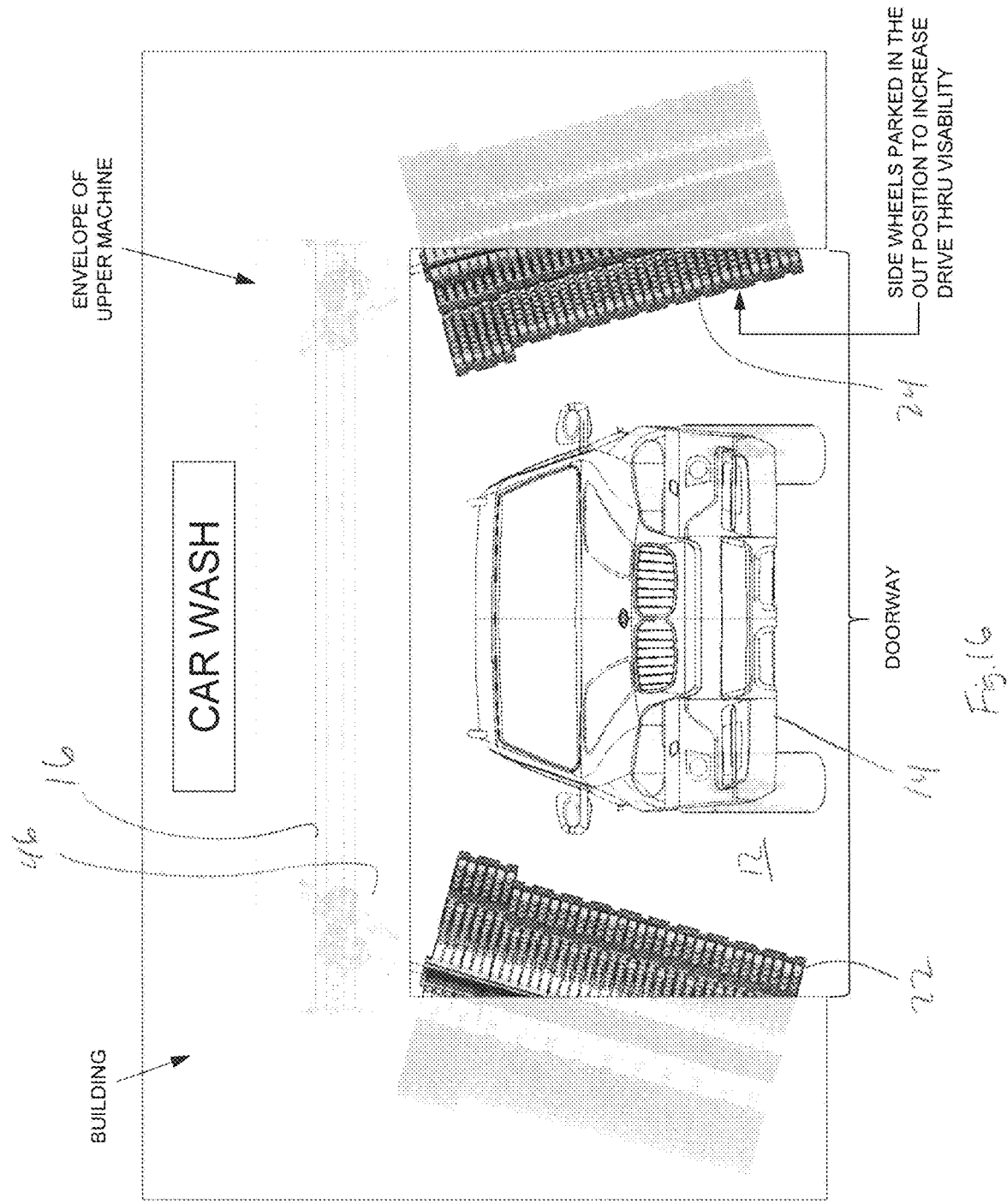
FIG. 16 illustrates the side brushes in an outwardly pivoted position to increase visibility during vehicle pull-through in accordance with an aspect of the present disclosure.

In yet another aspect, as shown in FIG. 16, the outwardly canted orientation may be used at a beginning and/or ending stage of the washing process, in which the brushes 22, 24 are outwardly canted prior to the vehicle 14 entering the vehicle treatment area 12 or after treatment is concluded. In this approach, the brushes 22, 24 are "opened" to increase the drive through visibility of the wash system 10. Once the vehicle is in position to be washed, the brushes 22, 24 may be adjusted to one of the other orientations and positioned into engagement with the vehicle 14 as described above. When the treatment is complete, the brushes 22, 24 may be canted outwardly as the vehicle 14 exits. This outward canting may be performed with or without the carriers 46 being moved further outward.

In the above description, the vehicle 14 remained stationary within the vehicle treatment area 12. However, it will be appreciated that the above described movement and pivoting of the side brushes 22, 24 relative to the vehicle body 14 may still occur even if the vehicle 14 is being conveyed. The side brushes 22, 24 may still be controlled to be pivoted based on the relative movement between the vehicle 14 and the brushes 22, 24 that defines the passes.

As described above, the side brushes 22, 24 may be pivoted or canted at different vehicle segments to avoid interference with vehicle components such as antennas or side mirrors.

As described above, the side brushes 22, 24 are in the form of rotational brushes in which the axle 36 and hub 32 rotates and the wash media 34 will contact and clean the vehicle exterior. The side brushes 22, 24 may be controlled at different rotational speeds, depending on the cleaning needs of the vehicle. While a high rotational speed may provide a greater impact against the vehicle exterior, the higher rotational speed and resulting linear speed at the exterior of the side brush 22, 24 can result in undesirable noise and potential damage to the vehicle finish. Of course, the brushes 22, 24 may still be controlled to rotate at a speed sufficient to slean the surfaces. However, in some cases, it may be desirable to use a lower rotational speed for the side brushes 22, 24 (or the top brush 20).

Figure 17:
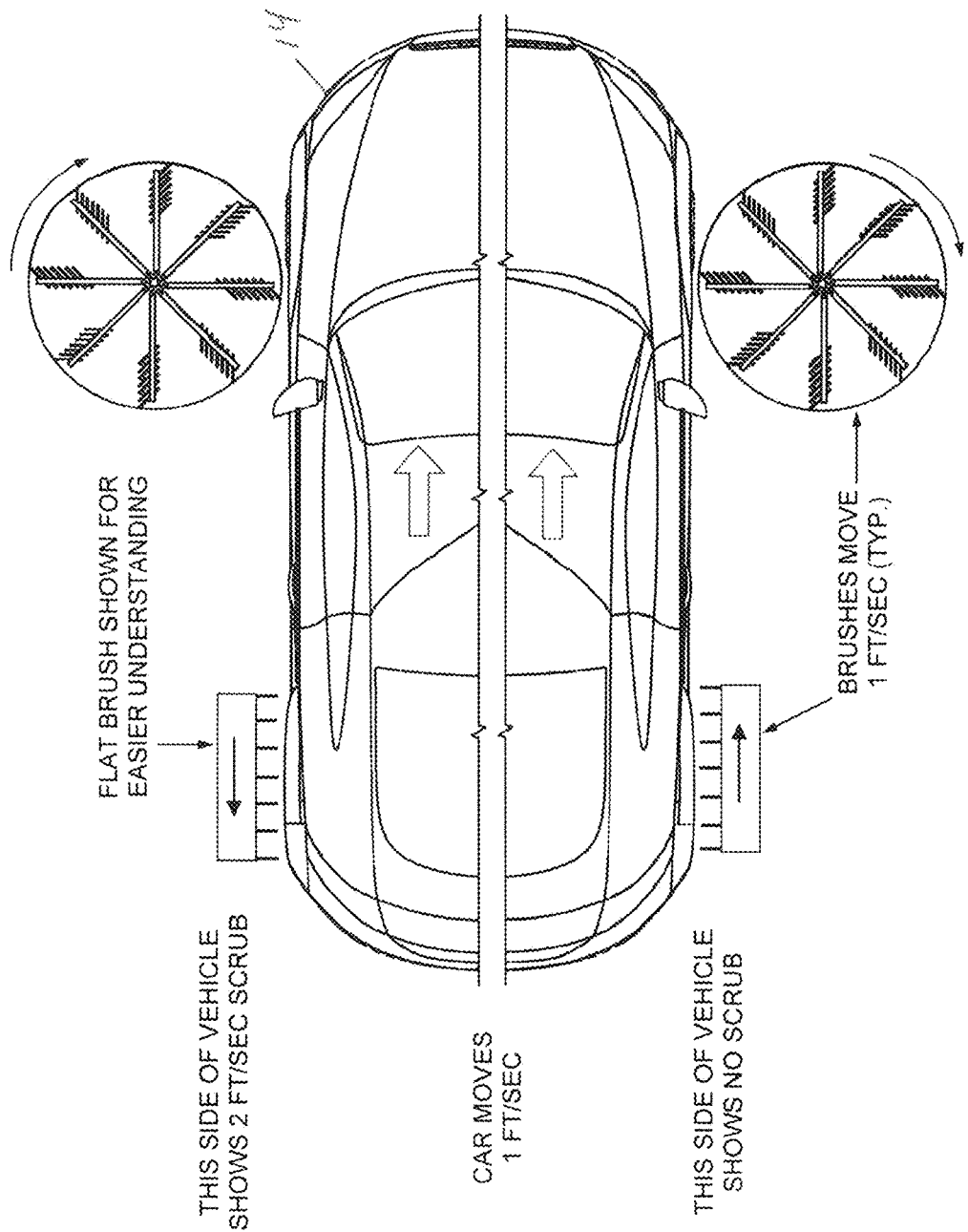
FIG. 17 illustrates a top view of a vehicle wash system illustrating a feed roller effect.

FIG. 17 illustrates rotational side brushes that have the same rotational direction when viewed from above, with the vehicle 14 moving left to right relative to the brushes. This may be accomplished by translating the side brushes right to left with a stationary vehicle, by translating the vehicle 14 left to right, or by a combination of the two. In any event, the vehicle 14 moves relative to the brushes. FIG. 17 also includes an illustration of flat brushes on each side of the vehicle 14 for reference to illustrate the linear direction of the surface of the brush that contacts the vehicle 14 during this relative translation. When the vehicle is moving left to right at 1 foot per second, for example, and the brush at the top of the page is rotating as shown and creating a 1 foot per second brushing surface speed, the effect is that of a flat brush moving right to left, as shown. Thus, the side of the vehicle at the top of FIG. 17 has a relative vehicle to brush scrub speed of 2 feet per second. At the bottom of the page, the direction of the surface brushing is the same speed as the movement of the vehicle 14. Thus, this side of the vehicle has an effective scrubbing speed of zero. This is the feed roller effect that is undesirable.

A lower rotational speed is more effective when the brush is traveling in a direction that is the same as the linear direction of the side brush 22, 24 on the vehicle side of the brush 22, 24. When the brush is traveling in an opposite direction as the wash media 34 at the vehicle interface, the brush 22, 24 may suffer from feed roller effects, where the wash media will essentially roll along the side of the vehicle with reduced impact, similar to a cylinder rolling along a surface. At increased speeds, the feed roller effect is reduced, because the speed of the brush may overcome the relative speed between the vehicle 14 and the brush 22, 24.

With reference to FIGS. 18 and 19, the side brushes 22, 24 may be controlled to rotate in the same rotational direction during both a right to left pass in the Figures and also a left to right pass. The speed of rotation may be altered depending on the direction. In one aspect, the side brushes 22, 24 are configured to rotate in a single rotational direction, regardless of the direction of travel of the side brushes 22, 24. The rotational speed of the side brushes 22, 24 may be altered depending on the direction of travel. For example, when the side brushes 22, 24 are traveling in the same direction as the linear direction of the wash media 34 at the interface with the vehicle, the side brushes 22, 24 may rotate at a first or reduced rotational speed. For example, when the brushes 22, 24 are moving front to back (right to left), the brushes 22, 24 will rotate such that the wash media 34 strikes the vehicle in a front to back (right to left) direction, such that the front to back impact is compounded, and the lower rotational speed may simply be added to the speed of translation.

When the side brushes 22, 24 are traveling in a direction that is opposite of the linear direction of the wash media 34 at the interface with the vehicle (such as back to front or left to right in the Figures), the side brushes 22, 24 may rotate at a second or increased rotational speed. For example, when the brushes 22, 24 are traveling back to front, the wash media 34 will rotate front to back, but at a greater rate, such that the rotational impact from the wash media 34 can overcome the feed roller effect. For example, to receive a 2 feet per second scrub speed, the brush may rotate to create a 3 feet per second surface speed of the wash media, which will overcome the 1 foot per second translation speed between the vehicle 14 and the brushes 22, 24.

It will be appreciated that the rotational direction at one side of the vehicle is opposite the rotational direction at the other side of the vehicle when the front to back or back to front direction is the factor that determines the speed of rotation. For example, as shown in FIGS. 18 and 19, the side brush 24 at the top of the page rotates clockwise, while the side brush 22 at the bottom rotates counter-clockwise.

However, the side brushes 22, 24 could both be rotated in the same rotational direction (such as both clockwise and both counter-clockwise). In this approach, on one side of the vehicle, the front to back movement would use the reduced rotational speed, and the other side of the vehicle would use the increased rotational speed front to back. Put another way, in this approach, the feed roller effect would be present on one side or the other during one translation direction, so the side with the feed roller effect may have the greater rotational speed.

The above control of the speed of rotation while keeping the direction of rotation the same for each of the side brushes 22, 24 allows for the system to operate without rotational direction reversal mechanism, which can be more complicated and costly.

The above described control of the side brushes 22, 24 to reduce the feed roller effect by altering the rotational speed based on the direction of travel of the brush may also be applied to other brushes that are translated relative to the vehicle 14. For example, the same control may be used for the top brush 20 in the event the top brush 20 is controlled to move both rearward and forward relative to the vehicle 14. Thus, it will be appreciated that the multi-speed control of the brushes is not limited to the side brushes 22, 24 illustrated and described herein.

The multi-speed control of the side brushes 22, 24 described above may be applied to the side brushes 22, 24 in both the vertical orientation as well as the pivoted or canted orientations described above. The speed of rotation may also be altered based on the vehicle segment that is being treated. The above described multi-speed control may be applied to bother rollover type systems and may also be applied to conveyor or tunnel type systems. In both cases, the vehicle 14 and brushes move relative to each other, and therefore the rotational speed may be increased when feed roller effects may be present.

Note that not all of the activities described above in the general description or the examples are required, that a portion of a specific activity may not be required, and that one or more further activities may be performed in addition to those described. Still further, the orders in which activities are listed are not necessarily the order in which they are performed.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure. Accordingly, the disclosure is to be regarded as illustrative rather than restrictive.

Certain features are, for clarity, described herein in the context of separate embodiments, may also be provided in combination in a single embodiment. Conversely, various features that are, for brevity, described in the context of a single embodiment, may also be provided separately or in any sub combination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A vehicle washing system, comprising:
   a rotational brush disposed adjacent a vehicle treatment area, the vehicle treatment area having a vertical height, a longitudinal length, and a lateral width and configured to receive a vehicle to be washed, the brush defining a central axis about which the brush rotates, the central axis extending between a first end and a second end of the brush;
   a brush shaft extending along the central axis and supporting the brush;
   the brush shaft being rotatable in a first rotational direction;
   the brush shaft being rotatable at a first rotational speed and a second rotational speed, wherein the first rotational speed is slower than the second rotational speed;
   wherein the brush has a first translation direction relative to the vehicle and a second translation direction relative to the vehicle that is opposite the first translation direction;
   wherein the brush shaft rotates at the first rotational speed in the first translation direction and the brush shaft rotates at the second rotational speed in the second translation direction.

2. The system of claim 1, wherein the brush translates at the same translational speed in the first translation direction and the second translation direction.

3. The system of claim 1, wherein the second rotational speed produces a linear speed at an outer circumference of the brush, wherein the linear speed is greater than a translational speed of the second translation direction.

4. The system of claim 1, wherein the first rotational speed produces a linear speed at an outer circumference of the brush, wherein the linear speed is less than or equal to a translational speed of the first translation direction.

5. The system of claim 1, wherein the rotational brush is a side brush, wherein the central axis extends between an upper end and a lower end of the side brush.

6. The system of claim 5, wherein the side brush is a first side brush and the system further comprises a second side brush, wherein the second side brush is disposed on an opposite lateral side of the vehicle.

7. The system of claim 6, wherein the first side brush and the second side brush rotate in opposite rotational directions.

8. The system of claim 7, wherein the rotational speed of the first and second side brush is increased in the second translation direction relative to the first translation direction.

9. The system of claim 6, wherein the first side brush and the second side brush rotate in the same rotational direction.

10. The system of claim 9, wherein the rotational speed of the first side brush is increased in the second translation direction relative to the first translation direction, and the rotational speed of the second side brush is decreased in the second translation direction relative to the first translation direction.

11. The system of claim 1, wherein the brush is a top brush having generally horizontal axis of rotation.

12. The system of claim 1, wherein the brush is coupled to longitudinally translatable frame.

13. The system of claim 1, wherein the brush has a first vertical orientation and is pivotable about an upper pivot point to a second orientation disposed at an oblique angle relative to the vertical orientation.

14. The system of claim 1, wherein the rotational direction of the brush does not change.

15. A method for treating a vehicle body in a vehicle washing system, the method comprising:
    providing a vehicle having a vehicle body within a vehicle treatment area of a vehicle washing system, wherein the vehicle treatment area has a vertical height, a longitudinal length, and a lateral width;
    positioning a rotatable brush within the vehicle treatment area, wherein the brush rotates about a central shaft thereof that is supported by an overhead frame;
    rotating the brush in a first rotational direction;
    contacting a surface of the vehicle body with the brush;
    translating the brush along the vehicle body in a first translation direction and rotating the brush at a first rotational speed during the translation in the first direction;
    translating the brush along the vehicle in a second translation direction and rotating the brush at a second rotational speed during the translation in the second direction, wherein the second rotational speed is greater than the first rotational speed.

16. The method of claim 15, wherein the brush rotates in the first rotational direction in both the first and second translation direction.

17. The method of claim 15, wherein the second rotational speed produces a linear speed at an outer circumference of the brush, wherein the linear speed is greater than a translational speed of the second translation direction.

18. The method of claim 15, wherein the first rotational speed produces a linear speed at an outer circumference of the brush, wherein the linear speed is less than or equal to a translational speed of the first translation direction.

19. The method of claim 15, wherein the step of providing the brush comprises providing a first brush and a second brush, wherein the first and second brushes are disposed on opposite lateral sides of the vehicle and each have top and bottom ends with an axis of rotation extending therebetween.

20. The method of claim 19, wherein the first and second brushes rotate in opposite rotational directions.

21. A vehicle washing system, comprising:
    a rotational brush disposed adjacent a vehicle treatment area, the vehicle treatment area having a vertical height, a longitudinal length, and a lateral width and configured to receive a vehicle to be washed, the brush defining a central axis about which the brush rotates, the central axis extending between a first end and a second end of the brush;
    the brush being rotatable in a first rotational direction;
    the brush being rotatable at a first rotational speed and a second rotational speed, wherein the first rotational speed is slower than the second rotational speed;

wherein the brush has a first translation direction relative to the vehicle and a second translation direction relative to the vehicle that is opposite the first translation direction;

wherein the brush shaft rotates at the first rotational speed in the first translation direction and the brush shaft rotates at the second rotational speed in the second translation direction;

wherein the brush rotates in the first rotational direction in both the first and second translation direction.

\* \* \* \* \*